US010524495B2

(12) United States Patent
Kim et al.

(10) Patent No.: US 10,524,495 B2
(45) Date of Patent: Jan. 7, 2020

(54) JUICE EXTRACTION MODULE FOR JUICE

(71) Applicants: NUC Electronics Co., Ltd., Daegu (KR); Jong Boo Kim, Daegu (KR); Ji Tae Kim, Daegu (KR)

(72) Inventors: Jong Boo Kim, Daegu (KR); Ji Tae Kim, Daegu (KR); O Jung Kwon, Daegu (KR); Young Dong Kim, Daegu (KR); Chan Yeol Kim, Daegu (KR); Ho Seok Lee, Daegu (KR); Seung Hee Lee, Daegu (KR)

(73) Assignees: NUC ELECTRONICS CO., LTD., Daegu (KR); Jong Boo Kim, Daegu (KR); Ji Tae Kim, Daegu (KR)

(*) Notice: Subject to any disclaimer, the term of this patent is extended or adjusted under 35 U.S.C. 154(b) by 721 days.

(21) Appl. No.: 14/805,239

(22) Filed: Jul. 21, 2015

(65) Prior Publication Data
US 2016/0021924 A1 Jan. 28, 2016

(30) Foreign Application Priority Data

Jul. 22, 2014 (KR) ........................ 10-2014-0092841
Jul. 22, 2014 (KR) ........................ 10-2014-0092842
(Continued)

(51) Int. Cl.
A23N 1/02 (2006.01)

(52) U.S. Cl.
CPC ..................................... A23N 1/02 (2013.01)

(58) Field of Classification Search
CPC . A47J 43/07; A47J 19/02; A47J 19/06; A23N 1/02
(Continued)

(56) References Cited

U.S. PATENT DOCUMENTS 7,455,300 B2 * 11/2008 Dudman .............. F16J 15/0818
277/626
2012/0137899 A1 6/2012 Kim
(Continued)

FOREIGN PATENT DOCUMENTS

CA 2 876 055 A1 1/2014
FR 2 982 472 A1 5/2013
(Continued)

OTHER PUBLICATIONS

Extended European Search Report, dated Feb. 10, 2016, for corresponding EP Application No. 15177942.8-1656 / 2976974, 10 pages.
(Continued)

Primary Examiner — Theodore J Stigell
Assistant Examiner — Spencer H. Kirkwood
(74) Attorney, Agent, or Firm — Seed IP Law Group LLP

(57) ABSTRACT

Disclosed herein is a juice extraction module for juice capable of fundamentally blocking the introduction of dregs which degrade a texture of food when being mixed with the juice and certainly maintaining airtightness. According to one embodiment of the present invention, a dregs blocking part which isolates between a bottom surface of a juice extraction mesh and a bottom of the container maintains airtightness to fundamentally block the introduction of dregs into the juice, thereby improving a texture of food.

8 Claims, 23 Drawing Sheets

(30) Foreign Application Priority Data

| | | | |
|---|---|---|---|
| Jul. 22, 2014 | (KR) | ...... | 10-2014-0092876 |
| Aug. 8, 2014 | (KR) | ...... | 10-2014-0102263 |
| Mar. 13, 2015 | (KR) | ...... | 20-2015-0001582 U |

(58) Field of Classification Search
USPC .................................................. 99/513
See application file for complete search history.

(56) References Cited

U.S. PATENT DOCUMENTS

| | | | | |
|---|---|---|---|---|
| 2013/0074708 A1* | 3/2013 | Asbury | ...... | A23N 1/02 99/513 |
| 2013/0125768 A1* | 5/2013 | Shi | ...... | A23L 11/07 99/513 |
| 2013/0172089 A1* | 7/2013 | Wette | ...... | F16D 3/845 464/175 |
| 2014/0283693 A1* | 9/2014 | Raude | ...... | A23N 1/02 99/513 |

FOREIGN PATENT DOCUMENTS

| | | | | |
|---|---|---|---|---|
| FR | 2 997 279 A1 | 5/2013 | | |
| JP | 2011-527229 A | 10/2011 | | |
| KR | 10-1038074 B1 | 6/2011 | | |
| KR | 10-1102902 B1 | 1/2012 | | |
| KR | 10-2012-0016532 A | 2/2012 | | |
| KR | 10-2012-0020880 A | 3/2012 | | |
| KR | 10-1159176 B1 | 6/2012 | | |
| KR | 10-2012-0111445 A | 10/2012 | | |
| KR | 10-1278596 B1 | 6/2013 | | |
| KR | 10-1278697 B1 | 6/2013 | | |
| KR | 10-1278698 B1 | 6/2013 | | |
| KR | 10-1311997 B1 | 9/2013 | | |
| KR | 200470211 Y1 * | 12/2013 | ...... | A47J 19/025 |
| KR | 200470211 Y1 * | 12/2013 | ...... | A47J 19/025 |
| KR | 10-1373608 B1 | 3/2014 | | |
| KR | 10-2014-0042176 A | 4/2014 | | |
| KR | 10-1408891 B1 | 6/2014 | | |
| KR | 10-1462650 B1 | 11/2014 | | |
| KR | 10-1500997 B1 | 3/2015 | | |
| WO | 2012/091235 A1 | 7/2012 | | |
| WO | WO 2012091235 A1 * | 7/2012 | ...... | A47J 43/0716 |
| WO | 2013/075409 A1 | 5/2013 | | |

OTHER PUBLICATIONS

Partial European Search Report dated Nov. 18, 2015 for EP Application No. 15177942.8-1656, 6 pages.

* cited by examiner

JUICE EXTRACTION MODULE FOR JUICE

CROSS-REFERENCE TO RELATED APPLICATIONS

This application claims priority from and the benefit of Korean Patent Application No. 10-2014-0092876, filed on Jul. 22, 2014, Korean Patent Application No. 10-2014-0092841, filed on Jul. 22, 2014, Korean Patent Application No. 10-2014-0092842, filed on Jul. 22, 2014, Korean Patent Application No. 10-2014-0102263, filed on Aug. 8, 2014, and Korean Utility Model Application No. 20-2015-0001582, filed on Mar. 13, 2015, each of which is hereby incorporated by reference for all purposes as if fully set forth herein.

BACKGROUND

Technical Field

The present disclosure relates to a juice extraction module for juice, and more particularly, to a juice extraction module for juice capable of reducing the introduction of dregs, which degrade a texture of food when being mixed with the juice, into the juice and the occurrence of dregs.

Description of the Related Art

In order to initiate a healthy lifestyle, as the number of families directly making green vegetables juice or juice has increased, apparatuses which may conveniently make juice using vegetables or fruits at home have been introduced.

In this regard, Korean Patent No. 10-1159176 entitled "A Juicer Having Opening And Closing Unit" (hereinafter, 'the related art') may be referred as an example of the apparatus.

The related art has a structure in which a housing 20 adheres to a lower end of a cover 10 and collects juice and discharges the juice to the outside, a center of a bottom of the housing 20 is provided with a waterproof unit 23 protruding upwardly, the waterproof unit 23 has a pressure discharge passage 27 provided at just an edges thereof and depressed downwardly, and a screw 40 rotates, having a lower end inserted into the housing 20.

The related art has a problem in that the lower end of the screw 40 passes through a lower end of a juice extraction mesh to be inserted into the housing, and therefore dregs are leaked to the housing through a gap between the screw 40 and the juice extraction mesh to thereby degrade a texture of food.

Further, Korean Patent No. 10-1038074 entitled "A Crush Apparatus" (hereinafter, 'the related art') has a driving transmission path from a main driving shaft 101 to a first rotating gear 102, a first rotating shaft 103, and a second power transmission gear 110 to rotate a rotating brush part 400.

However, the relate art has a problem in that the driving transmission path is complicated and unnecessary shaft members and gears need to be additionally mounted so as to transfer a driving force from a motor.

Therefore, the related art has a problem in that spaces and areas are additionally required as many as the increased number of shaft members and gears to thereby increase a total volume and weight of the apparatus.

Further, Korean Patent No. 10-1159176 entitled "A Juicer Having Opening And Closing Unit" (hereinafter, 'related art') may be referred as an example of the apparatus.

The related art has a structure in which the housing 20 adheres to the lower end of the cover 10 and collects juice and discharges the juice to the outside, the center of the bottom of the housing 20 is provided with the waterproof unit 23 protruding upwardly, a through hole 23a formed at the center of the waterproof unit 23 is provided with a through hole packing 25 which is made of rubber, silicon, etc., and prevents juice from flowing into a driving body 30.

However, the related art has a problem in that an upper end of the through hole packing 24 adheres over the whole of a lower space 43 of the screw 40 and therefore a friction area with the lower space 43 may be increased, to thereby hinder a rotation of the screw 40 and upon the use of the through hole packing 24 for a long period of time, a driving load of the driving motor may be increased and the through hole packing may be deformed and damaged, to thereby prevent airtightness from being continuously maintained.

Further, an example of a technology of forming a pushing blade at a bottom of a double screw to finely crush dregs may include Korean Patent No. 10-1278697 entitled "A Juicer Having Pushing Blades", Korean Patent No. 10-1278698 "A Juicer Having Pushing Blades", and Korean Patent No. 10-1278596 "A Juicer Having Pushing Blades", etc.

However, the related arts are only a structure in which lattice-shaped ribs, that is, pushing blades are alternately formed at a bottom of a screw and only a structure in which dregs adhering between a pushing blade and a bottom of a juice extraction mesh are crushed similar to being ground by a millstone.

In addition, the related arts have a problem in that differently from the millstone, a friction resistance between the pushing blade and the bottom of the juice extraction mesh is not so large and therefore raw materials having long and tough fibers such as water celery, bean sprouts, and celery are finely cut without being crushed, to thereby degrade juice extraction efficiency.

In particular, when the raw materials such as celery and water celery as described above are piled up while being extracted and moving to an outlet or are stagnated due to a slow discharge speed of dregs, the screw accommodated in the juice extraction mesh is pushed up as much as an amount of the so stagnated and piled up dregs and the dregs are permeated into a container in which a juice extraction liquid is collected through a gap corresponding to a rising height of the screw, thereby degrading a texture of food.

In other words, the raw materials having touch fibers is not much discharged to the outlet of dregs of the juice extraction mesh and thus are wound around the lower end of the screw, to thereby increase a rotating load of the driving motor and give inconvenience to cleaning when the juice extraction is finished.

BRIEF SUMMARY

An object of the present invention is to provide a juice extraction module for juice capable of fundamentally blocking the introduction of dregs which degrade a texture of food when being mixed with the juice and certainly maintaining airtightness.

Another object of the present invention is to provide a juice extraction module for juice capable of implementing weight reduction and compactness.

Still another object of the present invention is to provide a juice extraction module for juice capable of smoothly discharging moisture contained in dregs to a container while preventing the dregs inside the juice extraction mesh from being leaked to the container.

Still yet another object of the present invention is to provide a juice extraction module for juice capable of more finely crushing dregs of input raw materials to increase juice extraction efficiency and more improve a texture of juice.

As described above, a characteristic configuration of present invention is as follows for achieving the above objects of the present invention and specific effects of the present invention.

According to an exemplary embodiment of the present invention, there is provided a juice extraction module for juice, including: a juice extraction mesh configured to accommodate a screw supplied with a driving force to rotate; a rotating brush configured to be disposed at an outer side of the juice extraction mesh to rotate along with the screw; a container configured to accommodate the screw, the juice extraction mesh, and the rotating brush; and a hollow dregs blocking part configured to protrude to be stepped from a bottom of the juice extraction mesh and have a driving shaft penetrating through a central portion thereof, wherein the dregs blocking part is seated with the screw to prevent the dregs from being leaked to the container through the bottom of the juice extraction mesh.

The juice extraction module for juice may further include: a screw groove configured to be depressed from the bottom of the screw to correspond to the dregs blocking part so as to adhere to the dregs blocking part.

The juice extraction module for juice may further include: a screw cavity configured to be depressed from the bottom of the screw, accommodate the dregs blocking part, and provided with an extra space portion temporarily accommodating dregs introduced from the juice extraction mesh.

The juice extraction module for juice may further include: an elastic support part configured to be mounted at the dregs blocking part of the juice extraction mesh, have an inner circumferential surface facing an outer circumferential surface of the driving shaft connected to the screw, and disposed at one side of the driving shaft; a stand part configured to be formed at a lower end of the support part and fixed to be the dregs blocking part of the juice extraction mesh to stand the support part; and a blocking adhering part configured to be formed at an upper portion of the support part and prevent the dregs from being leaked between the dregs blocking part and a part through which the driving shaft penetrates while contacting the bottom of the screw and a screw groove by a pressure generated by the dregs introduced between the dregs blocking part and the screw or adhering to the outer circumferential surface of the driving shaft.

According to another exemplary embodiment of the present invention, there is provided a juice extraction module for juice, including: a juice extraction mesh configured to accommodate a screw supplied with a driving force to rotate; a rotating brush configured to be disposed at an outer side of the juice extraction mesh to rotate along with the screw; a container configured to accommodate the screw, the juice extraction mesh, and a rotating brush; a driving gear configured to penetrate through a bottom of the container to be mounted in a driving shaft connected to the screw and transfer a driving force to the rotating brush; a driving transmission assembly configured to have a lower end gear-connected with the driving gear and an upper end disposed at a bottom inside the container; and a driven gear configured to be gear-connected with an upper end of the driving transmission assembly and be formed along an inner circumferential surface of a lower portion of the rotating brush to rotate interlocking with the driving transmission assembly, wherein the driving gear, the driving transmission assembly, and the driven gear are disposed to be isolated from an inner space of the juice extraction mesh and the rotating brush.

According to still another exemplary embodiment of the present invention, there is provided a juice extraction module for juice, including: a juice extraction mesh configured to accommodate a screw supplied with a driving force to rotate; a rotating brush configured to be disposed at an outer side of the juice extraction mesh to rotate along with the screw; a container configured to accommodate the screw, the juice extraction mesh, and the rotating brush; and an elastic support part configured to be mounted at a bottom of the juice extraction mesh or mounted in a main body provided with the driving shaft and an elastic support part configured to, have an inner circumferential surface facing an outer circumferential surface of the driving shaft connected to the screw, and disposed at one side of the driving shaft; a stand part configured to be formed at a lower end of the support part and fixed to be the main body or the juice extraction mesh so as to stand the support part; and a blocking adhering part configured to be formed at an upper portion of the support part and prevent dregs or juice from being leaked to the container or the main body through the bottom of the juice extraction mesh while contacting the bottom of the screw or adhering to the outer circumferential surface of the driving shaft by a pressure generated by the dregs introduced from the bottom of the screw to be temporarily accommodated at the bottom of the screw.

According to yet another exemplary embodiment of the present invention, there is provided a juice extraction module for juice, including: a juice extraction mesh configured to accommodate a screw supplied with a driving force to rotate; a rotating brush configured to be disposed at an outer side of the juice extraction mesh to rotate along with the screw; a container configured to accommodate the screw, the juice extraction mesh, and the rotating brush; a hollow dregs blocking part configured to protrude to be stepped from the bottom of the juice extraction mesh and have a central portion provided with a blocking hole through which the driving shaft penetrates; a support part configured to have an outer circumferential surface facing an edge of the blocking hole and extend toward a bottom inside the container; a stand part configured to be formed on an outer circumferential surface of the support part to be fixed to the blocking hole, and stand a load of the support part; and a blocking adhering part configured to extend from an edge of a lower end of the support part to have a shape deformed and have a lower end to adhere to the bottom surface inside the container to prevent dregs or juice from being leaked to the container or a main body mounted with the driving shaft.

According to still yet exemplary embodiment of the present invention, there is provided a juice extraction module for juice, including: a screw configured to be supplied a driving force through a driving shaft to rotate; a juice extraction mesh configured to accommodate the screw; a container configured to accommodate the screw and the juice extraction mesh; a dregs blocking part configured to be provided with a blocking layer so that a bottom of the juice extraction mesh is isolated from a bottom of the container, a central portion of the blocking layer being provided with a hollow through which a driving shaft penetrates and an upper end of the blocking layer being provided with a ring-shaped reflow prevention protrusion; at least one juice discharge hole configured to be provided at the blocking layer of the dregs blocking part to discharge juice; and a packing member configured to be mounted in the hollow of the dregs blocking part to adhere to an outer circumferential surface of the driving shaft so as to prevent dregs from being leaked through a portion through which the driving shaft penetrates, wherein the dregs blocking part is seated with the screw to prevent the dregs from being leaked to the container through the bottom of the juice extraction mesh.

BRIEF DESCRIPTION OF THE SEVERAL VIEWS OF THE DRAWINGS

FIGS. 28 and 29 are comparison conceptual diagrams of a crushing mechanism of a first or second sawtooth formed in the cutting unit which is the main part of the juice extraction module for juice according to the embodiment of the present invention with a case in which the first or second sawtooth is not formed, in which FIG. 28 is a conceptual diagram of a case in which the first or second sawtooth is formed and FIG. 29 is a conceptual diagram of a case in which the first or second sawtooth is not formed.

DETAILED DESCRIPTION

Advantages and features of the present invention and a method achieving them will be more obvious with reference to exemplary embodiments to be described below in detail with reference to the accompanying drawings.

However, embodiments of the present invention may be modified in many different forms and it should not be limited to the exemplary embodiments set forth herein.

The present embodiments are provided to completely inform those skilled in the art of the scope of the present invention while clarifying the disclosure of the present invention.

Therefore, in some exemplary embodiments, well-known components, well-known operations, and well-known technologies are not described in detail to avoid that the present invention is ambiguously analyzed.

Further, throughout embodiments of the present invention, like reference numbers denote like components. Terms used in the present specification are to describe embodiments and do not limit the present invention.

In the present specification, a singular form may include plural forms unlike specifically indicated in the sentence and components and operations mentioned as "including (or comprising)" do not exclude presence or addition of other components and operations.

Unless defined otherwise, it is to be understood that all the terms (including technical and scientific terms) used in the specification has the same meaning as those that are understood by those who skilled in the art.

Further, the terms defined by the dictionary generally used should not be ideally or excessively formally defined unless clearly defined specifically.

Hereinafter, exemplary embodiments of the present invention will be described with reference to the accompanying drawings.

Figure 1:
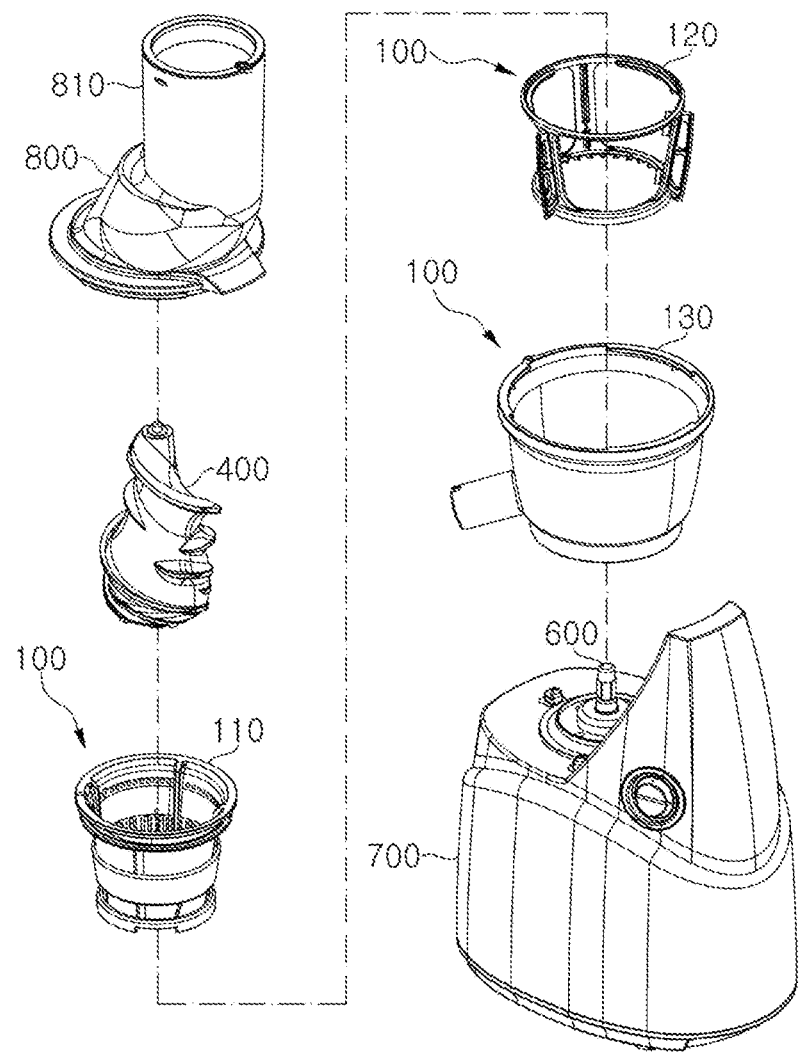
FIG. 1 is an exploded perspective view illustrating the overall structure of a juice extraction module for juice according to an embodiment of the present invention.

FIG. 1 is an exploded perspective view illustrating the overall structure of a juice extraction module for juice according to an embodiment of the present invention and FIGS. 2 to 5 are cross-sectional views illustrating a structure of a dregs blocking part which is provided in the juice extraction module which is a main part of the juice extraction module for juice according to various embodiments of the present invention.

For reference, non-explained reference numeral 800 represents a cover including an inlet 810.

First, a juice extraction module 100 includes a juice extraction mesh 110 which accommodates a screw 400 supplied with a driving force to rotate, a rotating brush 120 which is disposed at an outer side of the juice extraction mesh 110 to rotate along with the screw 400, and a container 130 which accommodates the screw 400, the juice extraction mesh 110, and the rotating brush 120.

The juice extraction module for juice according to the embodiment of the present invention includes a hollow dregs blocking part 112 which protrudes to be stepped from a bottom of the juice extraction mesh 110 and has a central portion through which the driving shaft 600 penetrates to isolate a bottom of the juice extraction mesh 110 from a bottom of the container 130, thereby fundamentally blocking dregs from being introduced into juice.

Therefore, an embodiment the present invention fundamentally blocks the introduction of dregs which degrade a texture of food when being mixed with the juice and certainly maintains airtightness.

According to the present invention, the embodiment as described above may be applied, and various embodiments to be described below may also be applied.

Figure 2:
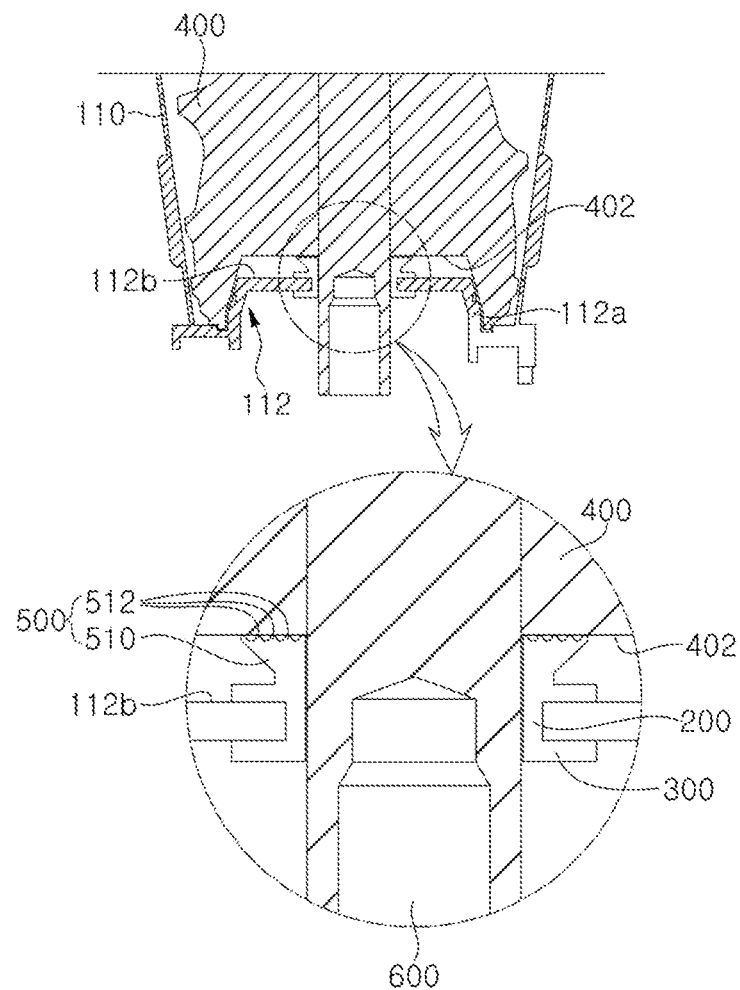
FIG. 2 is a cross-sectional conceptual view of the juice extraction module for juice according to the embodiment of the present invention.

As illustrated in FIG. 2, the dregs blocking part 112 further includes a screw groove 402 which is depressed from the bottom of the screw 400 to correspond to the dregs block part 112 so as to adhere to the dregs blocking part 112.

The screw groove 402 adheres to the dregs blocking part 112 to vertically form a gap between an inner wall of the screw groove 402 and an outer wall of the driving shaft 600, thereby making it difficult to enter dregs into the screw groove 402.

Meanwhile, a height and a depth of the dregs blocking part 112 and the screw groove 402 may be various.

Figure 5:
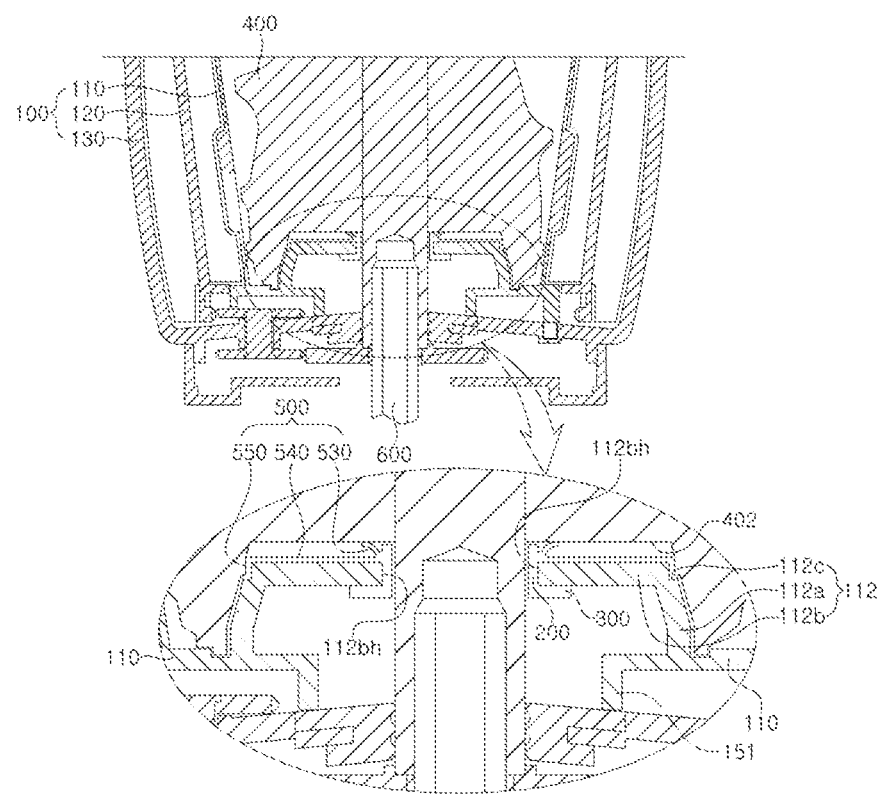
FIG. 5 is a cross-sectional conceptual view of a juice extraction module for juice according to still another exemplary embodiment of the present invention.

Meanwhile, describing in more detail with reference to FIG. 5, the dregs blocking part 112 may include a protruding barrier rib 112a, a seating surface 112b, and a seating step 112c.

The protruding barrier rib 112a has a ring-shaped member which protrudes from the bottom of the juice extraction mesh 110 to a predetermined height.

The seating surface 112b is connected to an edge of an upper end of the protruding barrier rib 112a to be parallel with the bottom of the juice extraction mesh 110 and has a central portion provided with a blocking hole 112bh through which the driving shaft 600 penetrates.

The seating step 112c is formed to be stepped along an outer circumferential surface of the protruding barrier rib 112a and the screw 400 is locked to the seating step 112c.

Figure 3:
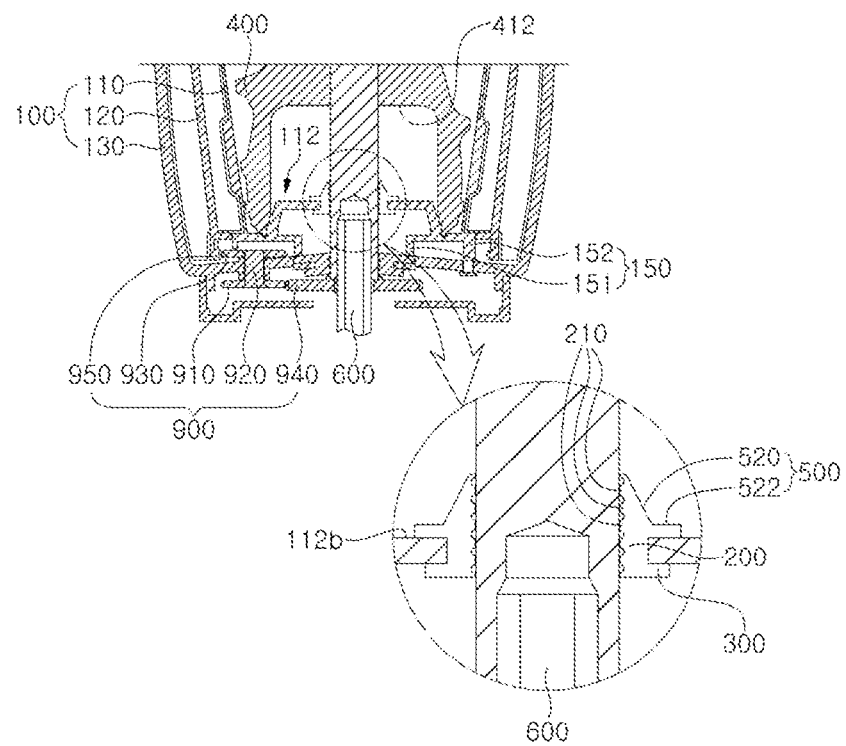
FIG. 3 is a cross-sectional conceptual view of a juice extraction module for juice according to another exemplary embodiment of the present invention.
Figure 4:
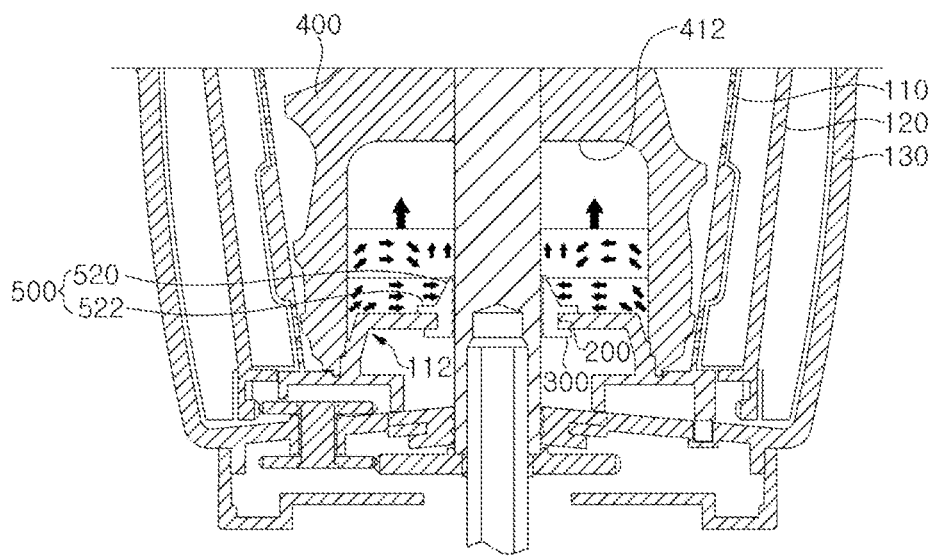
FIG. 4 is a cross-sectional conceptual view of a structure of the juice extraction module for juice of FIG. 3.

Further, as illustrated in FIGS. 3 and 4, the juice extraction module for juice according to the embodiment of the present invention may further include a screw cavity 412 forming an extra space portion which is depressed from the bottom of the screw 400, accommodates the dregs block part 112, and an extra space portion in which dregs introduced from the juice extraction mesh 110 are temporarily accommodated, along with the dregs blocking part 112.

According to the present invention, the embodiment as described above may be applied, and various embodiments to be described below may also be applied.

The juice extraction module for juice may further include: an elastic support part 200 configured to be mounted at the dregs blocking part 112 of the juice extraction mesh 110, have an inner circumferential surface facing an outer circumferential surface of the driving shaft 600 connected to the screw 400, and disposed at one side of the driving shaft 600; a stand part 300 configured to be formed at a lower end of the support part 200 and fixed to be the dregs blocking part 112 of the juice extraction mesh 110 to stand the support part 200; and a blocking adhering part 500 configured to be formed at an upper portion of the support part 200 and prevent the dregs from being leaked between the dregs blocking part 112 and a part through which the driving shaft 600 penetrates while contacting the bottom of the screw 400 and a screw groove 400 by a pressure due to the dregs introduced between the dregs blocking part 112 and the screw 400 or adhering to the outer circumferential surface of the driving shaft 600.

As illustrated in FIG. 2, the blocking adhering part 500 may include an upward expanding diameter part 510 having a gradually increasing diameter toward the upper end so that it adheres by a load of the screw 400 itself when an interval between the bottom of the screw 400 and the upper end surfaces of the screw groove 402 and the blocking part 112 is narrow to achieve airtightness and a plurality of adhering ribs which protrude to be spaced apart from each other in a concentric circle form at an upper surface of the upward expanding diameter part 510 and adhere to the bottom of the screw 400 and the screw groove.

Further, as illustrated in FIGS. 3 and 4 in the blocking adhering part 500, the screw cavity 412 is formed in the screw 400 so that the support part 200 is mounted in the dregs blocking part 112 when the interval from the upper end surface of the blocking part 112 is wide and, the support part 300 is fixed to the dregs blocking part 112, and the blocking adhering part 500 may also include a downward expanding diameter part 520 having a gradually increasing diameter toward the lower end so that it adheres to the outer circumferential surface of the driving shaft 600 by the pressure of dregs temporarily accommodated, as illustrated in FIG. 4.

Further, the support part 200, the stand part 300, and the blocking adhering part 500 may have a typical packing structure as a structure to prevent dregs from being leaked between the driving shaft 500 and the blocking hole 112bh, but in the typical packing structure according to the embodiment of the present invention, a component such as the blocking adhering part 500 is added, thereby secondarily maintaining airtightness.

As described above, it may be appreciated that the basic technical spirit of the present invention is based on the juice extraction module for juice capable of fundamentally blocking the introduction of dregs which degrade a texture of food when being mixed with the juice and certainly maintaining airtightness.

Figure 6:
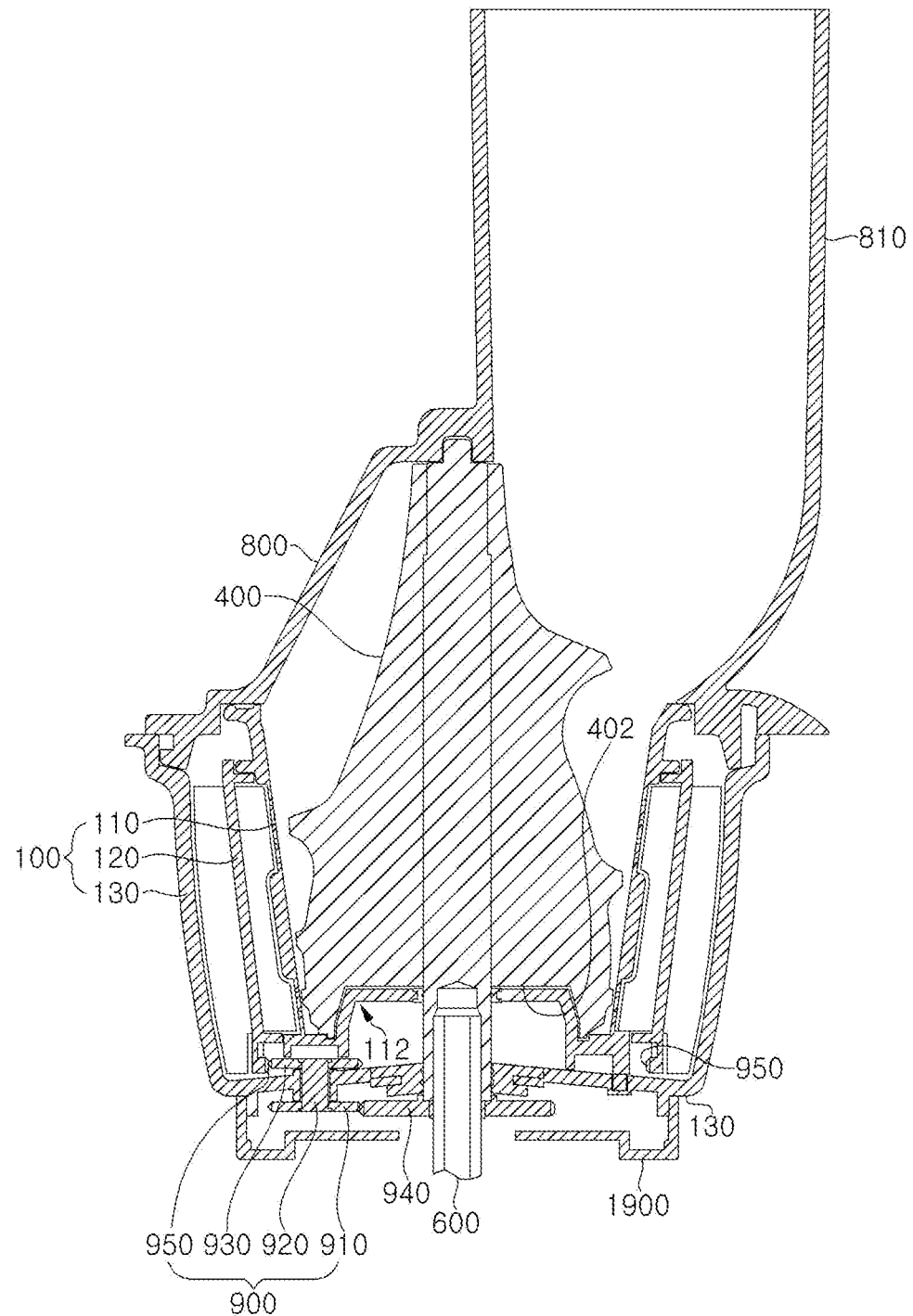
FIG. 6 is a cross-sectional conceptual view illustrating a coupling relationship between a juice extraction module and a driving gear and a coupling relationship between a driving transmission assembly and a driven gear, which are main parts of the juice extraction module for juice according to the embodiment of the present invention.

FIG. 6 is a cross-sectional conceptual view illustrating a coupling relationship between a juice extraction module and a driving gear and a coupling relationship between a driving transmission assembly and a driven gear, which are main parts of the juice extraction module for juice according to various embodiments of the present invention.

A driving gear 940 is configured to penetrate through a bottom of the container 130 to be mounted in the driving shaft 600 connected to the screw 400 and transfer a driving force to the rotating brush 120.

A driving transmission assembly 900 is configured to have a lower end gear-connected with the driving gear 940 and an upper end disposed in a bottom inside the container 130.

The driven gear 950 is configured to be gear-connected with the upper end of the driving transmission assembly 900 and be formed along an inner circumferential surface of the lower portion of the rotating brush 120 to rotate along with the driving transmission assembly 900.

In this configuration, the driving gear 950, the driving transmission assembly 900, and the driven gear 950 are disposed to be isolated from an inner space of the juice extraction mesh 110 and the rotating brush 120 to prevent dregs and juice generated during the juice extraction process from being leaked.

According to the present invention, the embodiment as described above may be applied, and various embodiments to be described below may also be applied.

The bottom inside the container 130 may be formed to be gradually increased from an edge toward a central portion to smoothly discharge the juice extracted undiluted solution.

The driving gear 940 may be disposed outside the container 130 so that it may be driven in the state in which it is isolated from a part of dregs and juice which may be leaked in some cases.

In this configuration, the driving transmission assembly 900 include a lower transmission gear 910 which is gear-connected with the driving gear 950, a middle shaft 920 which protrudes from a central portion of the lower transmission gear to rotate while penetrating through and supported to the bottom of the container 130, and an upper transmission gear 930 which is provided at the upper end of the middle shaft 920 to be gear-connected with the driven gear 950.

That is, the driving transmission assembly 900 has an "H"-letter shape in which a shape of a section of the driving transmission assembly 900 lies down at 90° to interlock the screw 400 with the rotating brush 120 and extremely simplify the driving transmission path.

A detailed disposition position of the driving transmission assembly 900 is as follows.

Figure 7:
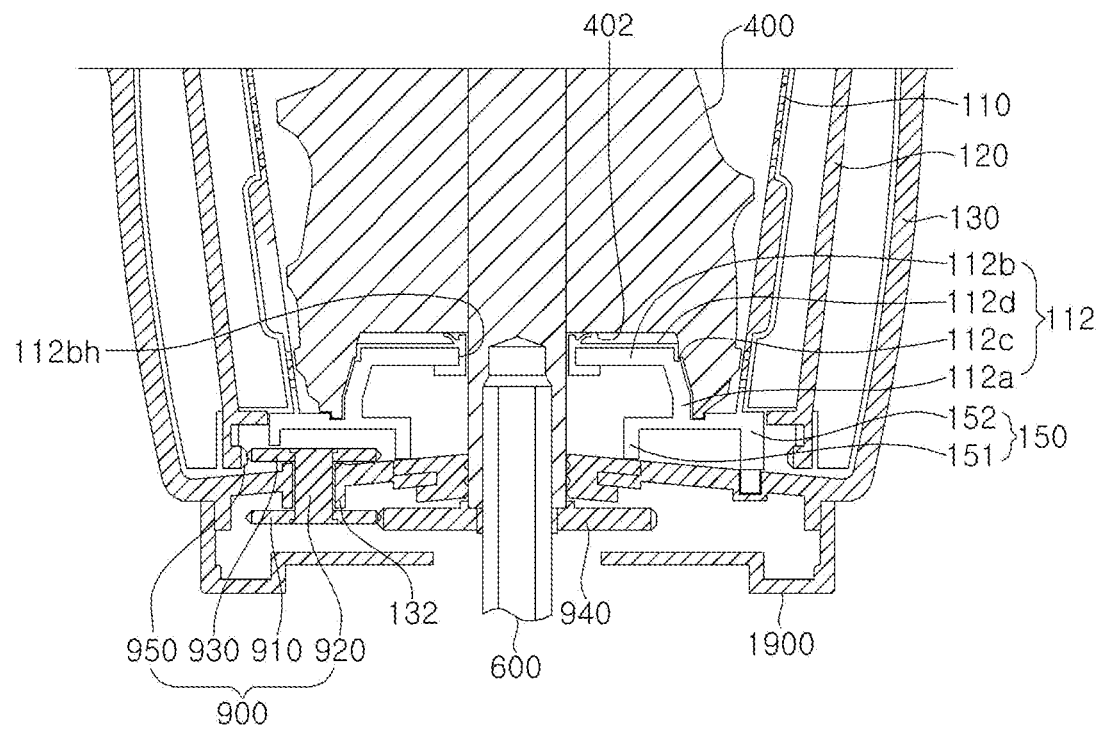
FIG. 7 is a partial cross-sectional conceptual view illustrating a coupling relationship between a juice extraction module and a driving gear and a coupling relationship between a driving transmission assembly and a driven gear, which are main parts of the juice extraction module for juice according to another embodiment of the present invention.

That is, as illustrated in FIGS. 6 and 7, the lower transmission gear 910 is gear-connected with the driving gear 950 disposed outside the container 130 and is disposed outside the container 130.

The upper transmission gear 930 is disposed at the upper end of the middle shaft 920 to be gear-connected with the driven gear 950 and disposed at the bottom inside the container 130.

Here, the juice extraction module for juice according to the embodiment of the present invention further includes a both-end-penetrating support bushing 132 which protrudes from the bottom outside the container 130 to support the middle shaft 920, to thereby support the stable rotation of the middle shaft 920.

Figure 8:
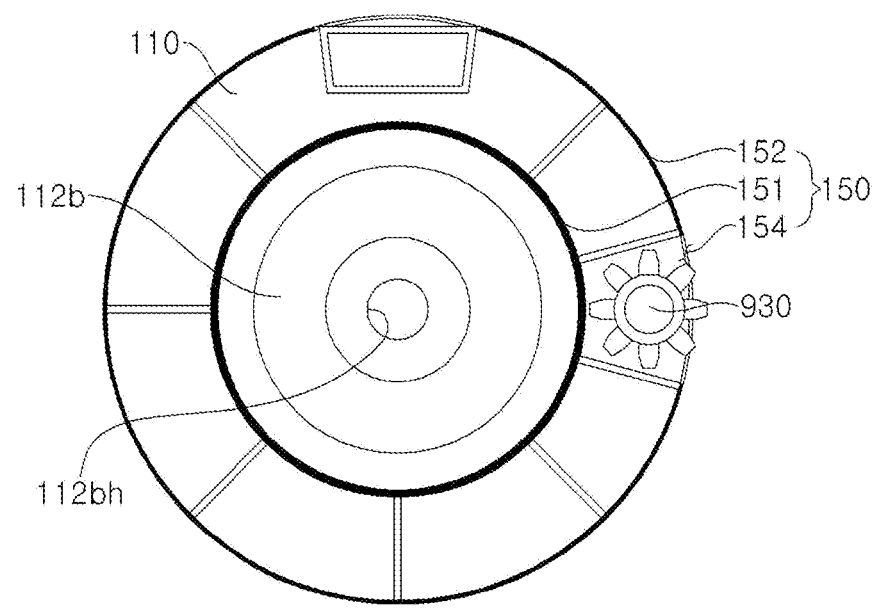
FIGS. 8 and 9 are bottom conceptual diagrams illustrating a structure viewed from a bottom of a juice extraction mesh in the juice extraction module, which are the main parts of the juice extraction module for juice according to another embodiment of the present invention.
Figure 9:
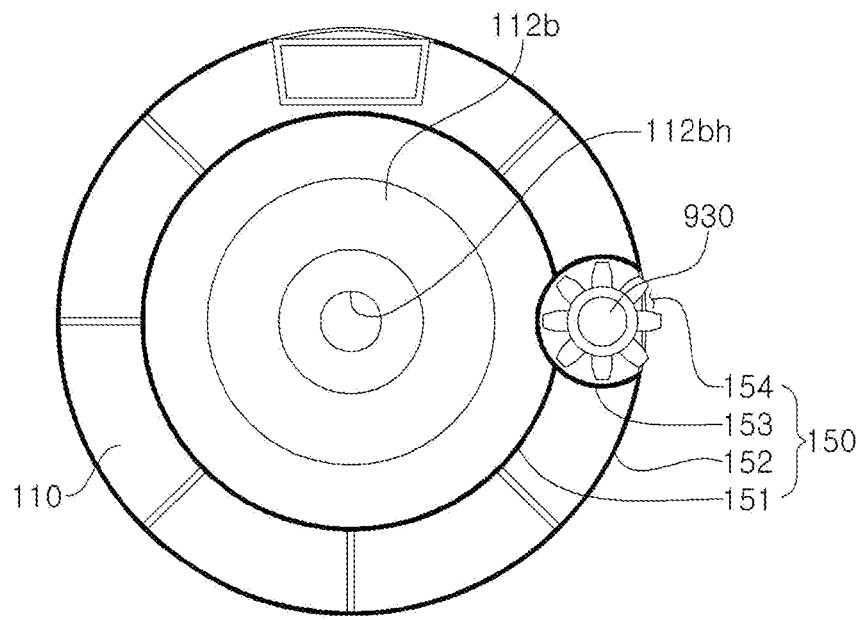

In this case, as illustrated in FIGS. 7 to 9, the juice extraction module for juice may further include an isolating means 150 which is formed at the lower portion of the juice extraction mesh 110 to maintain the state in which the bottom of the container 130 is isolated from the lower portion of the juice extraction mesh 110, not to thereby hinder the gear connection between the upper transmission gear 930 and the driven gear 950 and the rotation thereof while certainly maintaining airtightness.

That is, as illustrated in FIG. 8, the isolating means 150 is based on the bottom surface of the juice extraction mesh 110 and protrudes from the bottom surface outside the juice extraction mesh 110 and an edge of a lower end thereof includes a ring-shaped first barrier rib 151 which adheres to the bottom inside the container 130 and a ring-shaped second barrier rib 152 which protrudes along the edge of the bottom of the juice extraction mesh 110 and has the edge of the lower end adhering to the bottom surface inside the container 130.

Here, the isolating means 150 is formed by partially cutting the second barrier rib 152 and may further include a cutting part 154 to which a part of the outer circumferential surface of the upper end of the driving transmission assembly 900, that is, a part of the upper transmission gear 930 of which the central portion is disposed between the first barrier rib 151 and the second barrier rib 152 is exposed.

In this case, as illustrated in FIG. 9, the isolating means 150 is disposed between the first barrier rib 151 and the second barrier rib 152 from both ends of the cutting part 154 while being spaced apart from the outer circumferential surface of the upper end of the driving transmission assembly 900 at a predetermined interval so as to enclose the outer circumferential surface of the upper end of the driving transmission assembly 900 and further includes a third barrier rib 153 which protrudes from the bottom of the juice extraction mesh 110.

Meanwhile, the juice extraction module for juice according to the embodiment of the present invention may further include the hollow dregs blocking part 112 which protrudes to be stepped from the bottom of the juice extraction mesh 110 and has the central portion through which the driving shaft 600 penetrates, in which the dregs blocking part 110 is seated with the screw 400.

Generally, fibrous dregs are transferred to the bottom of the juice extraction mesh 110 along a rotating blade of the screw 400 and the dregs transferred to a floor of the juice extraction mesh 110 is discharged to a dregs outlet of the container 130 through a juice extraction mesh outlet (not illustrated) which is formed at the floor of the juice extraction mesh 110.

In the structure of the juice extraction module for juice as described above, according to the related art, fibrous dregs transferred to the floor of the juice extraction mesh is not discharged only through the juice extraction mesh outlet but is leaked to a gap between the screws 400 to be mixed with a juice-extracted solution, and as a result a large amount of fibrous dregs are contained in the juice-extracted solution to degrade a texture of food.

Therefore, the dregs blocking part 112 is a technical means which is formed at the bottom of the juice extraction mesh 110 to seat the screw 400 thereon so as to make it difficult to leak the dregs transferred to the floor of the juice extraction mesh 110, thereby preventing a large amount of dregs from being contacted in the juice-extracted solution.

Figure 10:
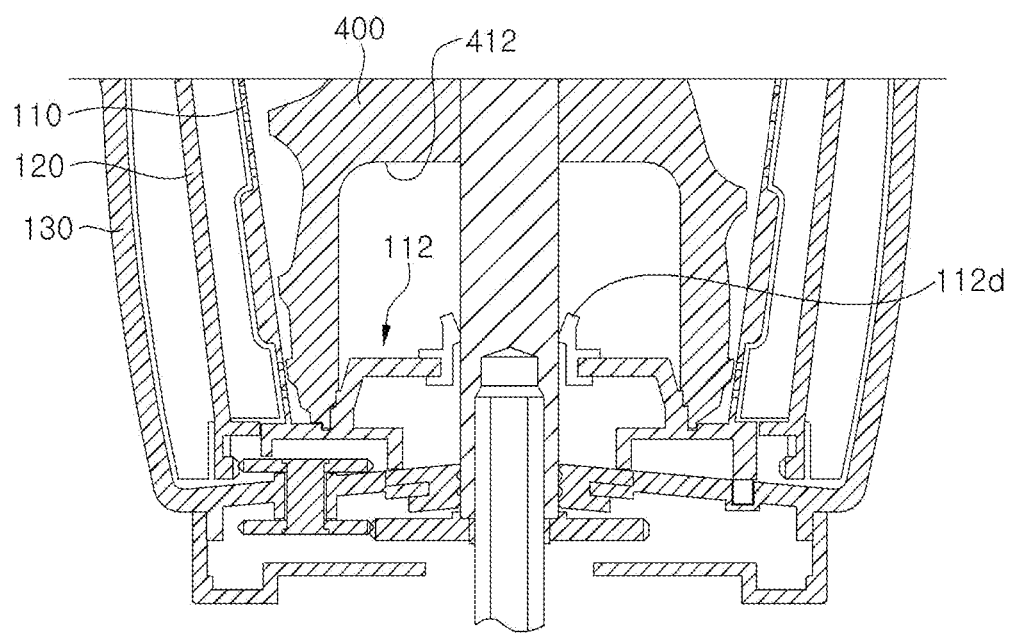
FIGS. 10 to 12 are partial cross-sectional views illustrating the overall structure and a use state of the juice extraction module for juice according to still another embodiment of the present invention.
Figure 11:
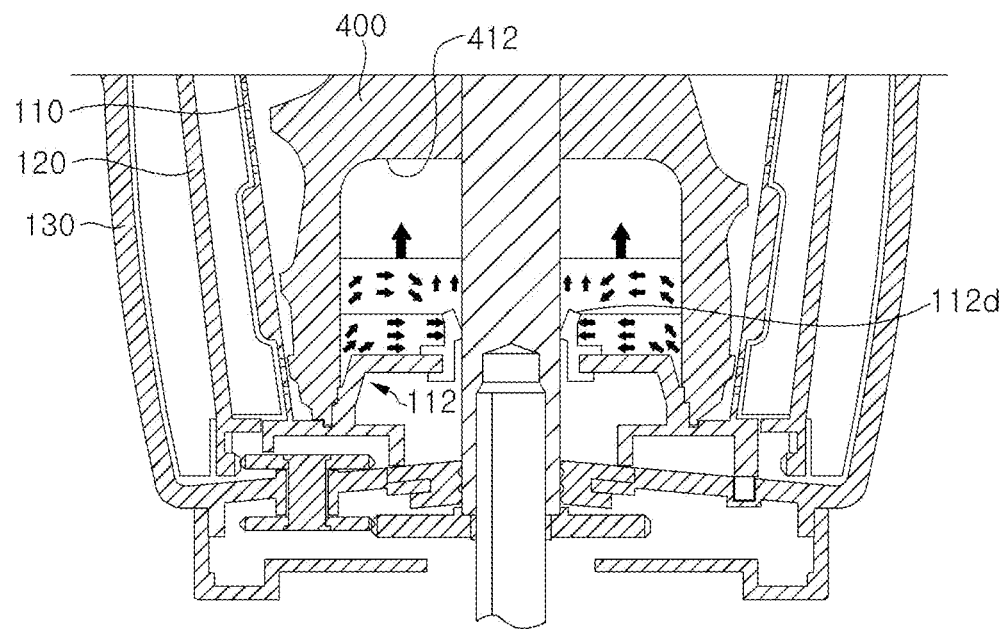

Meanwhile, as illustrated in FIGS. 10 and 11, the juice extraction module for juice according to the embodiment of the present invention may further include a screw cavity 412 forming an extra space portion which is depressed from the bottom of the screw 400, accommodates the dregs block part 112, and an extra space portion in which dregs introduced from the juice extraction mesh 110 are temporarily accommodated, along with the dregs blocking part 112.

That is, the screw cavity 412 forms the extra space portion having a larger volume than that of the screw groove 402 to sufficiently secure the space in which the dregs are accommodated, thereby more certainly maintaining the airtightness by the pressure applied from the outer side of the packing member 112d which is mounted therein by the pressure of the dregs temporarily accommodated in the extra space portion.

Figure 12:
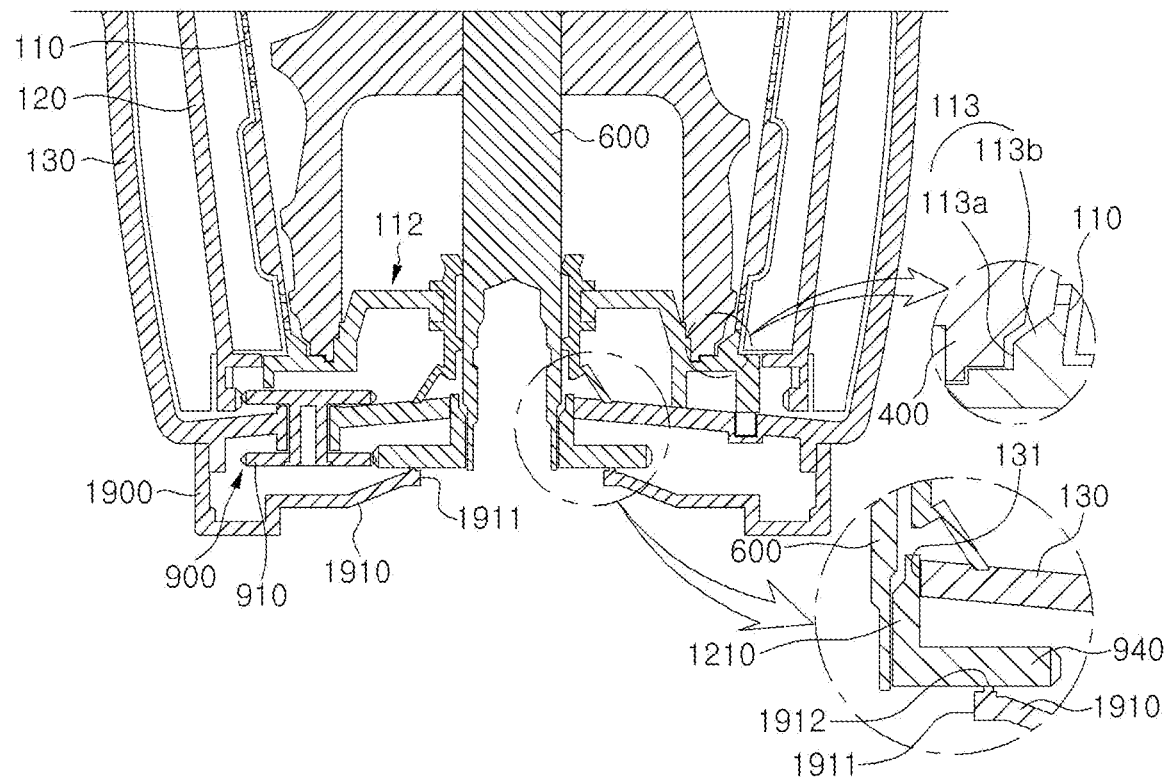

Meanwhile, the juice extraction module for juice according to the embodiment of the present invention includes a gear box 1900 which accommodates and stands the driving gear 940 as illustrated in FIG. 12.

That is, the juice extraction module for juice according to the embodiment of the present invention may further include the gear box 1900 which is formed at the bottom outside the container 130 and accommodate the driving gear 940, in which the bottom of the gear box 1900 is further provided with a stepped part 1910 which is formed to be steeped toward the bottom outside the container 130 and has a central portion provided with a gear standing hole 1911 penetrating therethrough.

Here, an inner surface of the stepped part 1910 is provided with the gear standing sheet 1912 which protrudes in a ring shape to be parallel with an edge of the gear standing hole 1911 to stand the bottom of the driving gear 940.

To this end, the driving gear 940 extends from an edge of a lower end of a both-end-penetrating rotating support bushing 1210 which has an inner diameter larger than the outer diameter of the driving shaft 600, an outer circumferential surface supported to the support hole 131 penetrating through the bottom of the container 130, and has the driving shaft 600 disposed therein while penetrating therethrough.

In this case, the bottom inside the container 130 is formed to gradually rise from the edge toward the central portion to discharge the juice-extracted dregs and the juice.

Therefore, the driving gear 940 extends from the edge of the lower end of the rotating support bushing 1210 to rotate while being stood by the gear standing sheet 1912, thereby stably performing the driving transmission function without worrying about the occurrence of problems such as shaking and raffling even though it rotates with being engaged with the driven gear 950.

Further, the rotating support bushing 1210 itself may serve to maintain airtightness by replacing the packing which is mounted at the bottom inside the container 130 and thus save raw materials such as resin and rubber, thereby producing the juice extraction module for juice according to the embodiment of the present invention at a cheap price.

Meanwhile, the juice extraction module for juice according to the embodiment of the present invention may further include a plurality of juice extraction auxiliary protrusions 113 which are formed at the bottom and the inner side of the juice extraction mesh 110 at a predetermined interval to face the outer circumferential surface of the lower portion of the screw 400, to thereby increase the juice extraction rate by once more grinding materials which are juice-extracted by the screw 400 and then discharged down.

That is, the juice extraction auxiliary protrusions 113 includes a plurality of protruding pieces 113a which protrude from the bottom of the juice extraction mesh 110 to be connected to the inner side of the juice extraction mesh 110 and tilted pieces 113b which extend to be inclined upward from the upper end of the protruding pieces 113a toward the inner side of the juice extraction mesh 110.

Therefore, raw materials which are ground and juice-extracted between the screw 400 and the juice extraction mesh 110 is primarily crushed once between the outer circumferential surface of the lower portion of the screw 400 and the tilted piece 113b while flowing down toward the bottom of the juice extraction mesh 110 and then is secondarily crushed between the outer circumferential surface of the lower portion of the screw 400 and the protruding piece 113a to perform the juice extraction to the utmost.

As described above, it may be appreciated that the basic technical spirit of the present invention is based on the juice extraction module for juice capable of simplifying the driving transmission path to reduce the number of parts and save production costs, maintaining airtightness, and implementing weight reduction and compactness.

FIGS. 13 to 19 are cross-sectional conceptual views illustrating a structure of the support part, the stand part, and the blocking adhering part which are main parts of the juice extraction module for juice according to various embodiments of the present invention.

The support part 200 is mounted at the bottom surface of the juice extraction mesh 100 or the main body 700 and is an elastic member which forms an inner circumferential surface facing the outer circumferential surface of the driving shaft 600 connected to the screw 400 and is disposed at one side of the driving shaft 600.

The stand part 300 is formed at the lower end of the support part 200 to be fixed to the main body 700 or the juice extraction mesh 110 in which the driving shaft 600 is mounted, to thereby standing the support part 200.

The blocking adhering part 500 is formed at the upper portion of the support part 200 to prevent dregs or juice from being leaked to the container 130 or the main body 700 through the bottom of the juice extraction mesh 110 while contacting the bottom of the screw 400 or adhering to the outer circumferential surface of the driving shaft 600 by the pressure generated by the dregs introduced from the bottom of the screw 400 to be temporarily accommodated at the bottom of the screw 400.

Therefore, an embodiment of the present invention fundamentally blocks the introduction of dregs which degrade a texture of food when being mixed with the juice and certainly maintains airtightness.

According to the present invention, the embodiment as described above may be applied, and various embodiments to be described below may also be applied.

Figure 13:
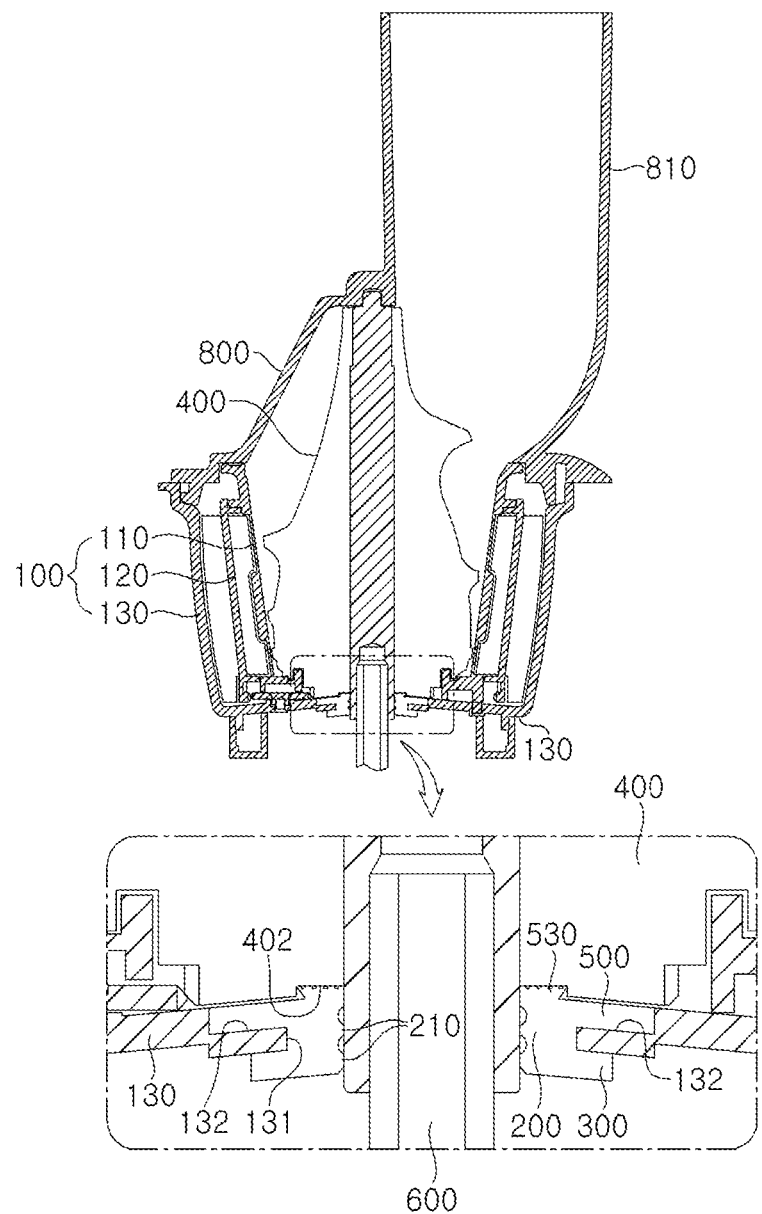
FIGS. 13 to 19 are cross-sectional conceptual views illustrating a structure of a support part, a stand part, and a blocking adhering part which are mounted in the juice extraction module, which are main parts of the juice extraction module for juice according to various embodiments of the present invention.

As illustrated in FIG. 13, the support part 200 may further include a plurality of contact ribs 210 which protrude in a ring shape along the inner circumferential surface to contact the outer circumferential surface of the driving shaft 600 and are disposed to be spaced apart from each other along a vertical direction of the inner circumferential surface.

The plurality of contact ribs 210 each contact the outer circumferential surface of the driving shaft 600 to form a plurality of barriers which structurally maintain the airtightness which makes it difficult to leak dregs or juice.

Here, the juice extraction module for juice according to the embodiment of the present invention further includes the screw groove 402 which is depressed at the bottom surface of the screw 400, in which the blocking adhering part 500 adheres to the screw groove 400 while being seated therein.

In this case, the bottom inside the container 130 is formed to gradually rise from the edge toward the central portion, the support part 200 having the inner circumferential surface facing the outer circumferential surface of the driving shaft 600 is fixed to the center of the bottom surface inside the container 130, the stand part 300 is fixed to the bottom surface outside the container 130, and the blocking adhering part 500 protrudes from the bottom inside the container 130 to adhere to the bottom of the screw 400.

The foregoing structure will be described below in more detail.

A communicating hole 131 through which the driving shaft 600 penetrates is configured to penetrate through the center of the bottom inside the container 130 and a seating step 132 is formed to be stepped on the bottom inside the container 130 along the edge of the communicating hole 131.

Therefore, the support part 200 is fixed to the communicating hole 131, the stand part 300 adheres to the bottom surface outside the container 130 along an edge of the communicating hole 131, and the blocking adhering part 500 is seated in the seating step to face the bottom of the screw 400.

In this case, the blocking adhering part 500 further includes an elastic adhering lip 530 which protrudes in a ring shape at the upper side of the blocking adhering part 500 to have the shape deformed so that it is spaced apart from the outer circumferential surface of the driving shaft 600 at a predetermined interval and adheres to the screw groove 402 formed at the bottom of the screw 400.

Figure 14:
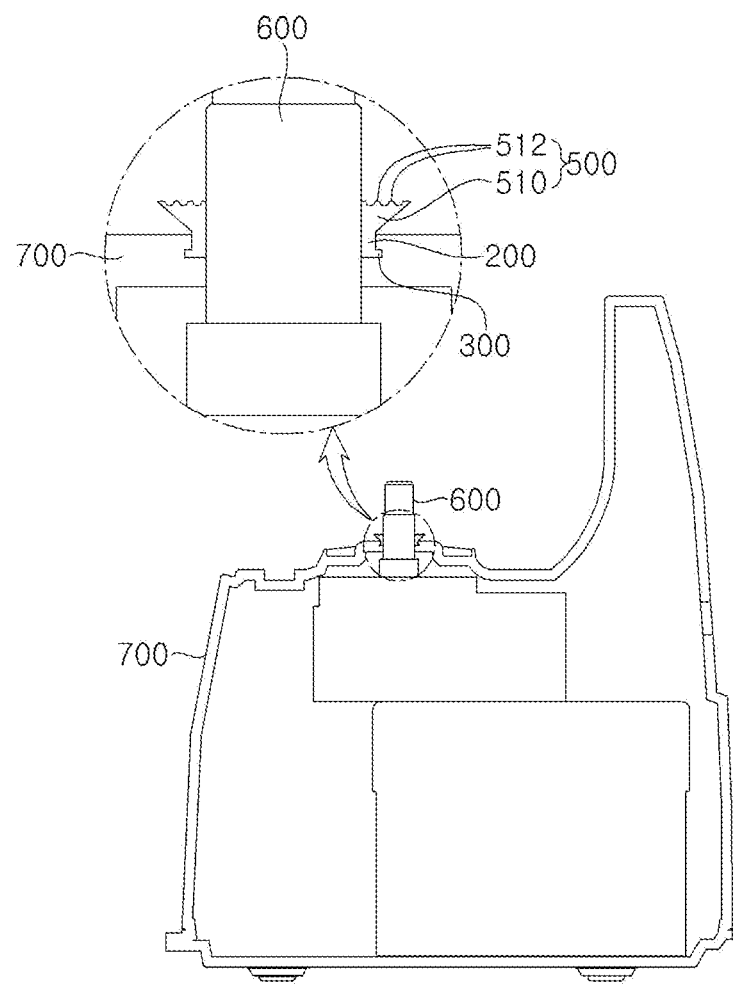

Meanwhile, as illustrated in FIG. 14, the blocking adhering part 500 includes the upward expanding diameter part 510 which has a gradually increasing diameter toward the upper end to maintain the airtightness while adhering by the load of the screw 400 itself and a plurality of adhering ribs 512 which protrude while being spaced apart from each other in a concentric circle form at the upper surface of the upward expanding diameter part 510 and adhere to the bottom of the screw 400.

Figure 15:
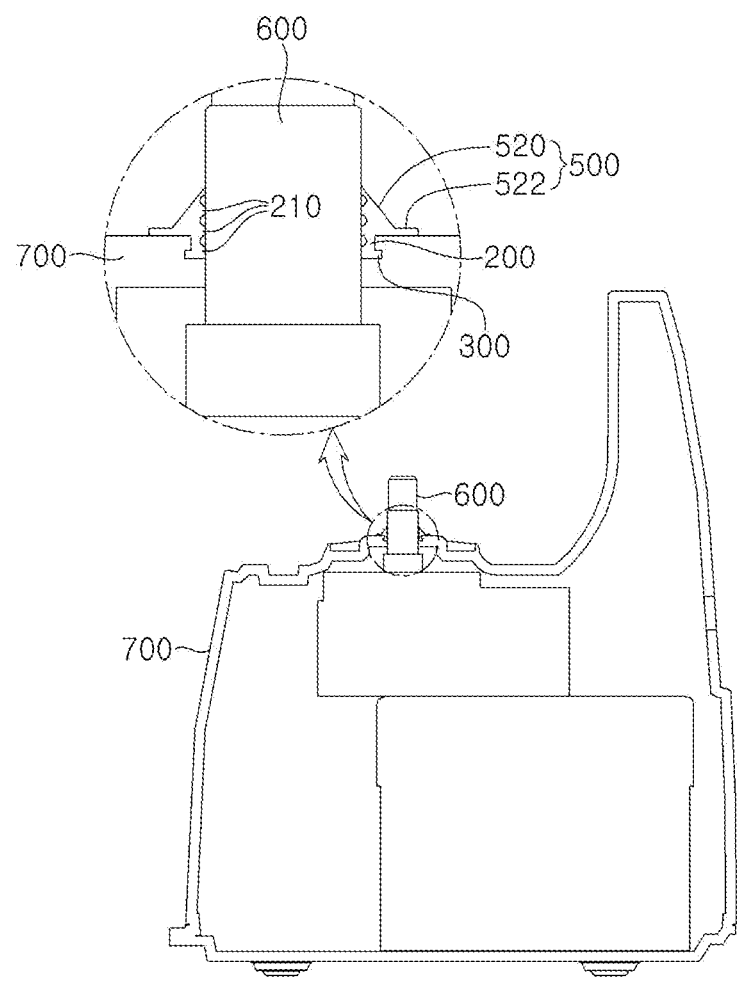

Further, as illustrated in FIG. 15, the blocking adhering part 500 includes the downward expanding diameter part 520 having a gradually increasing diameter from the outer circumferential surface of the upper end of the support part 200 toward the lower portion and an adhering flange part 522 which extends from the edge of the downward expanding diameter part 522 to be fixed to the bottom of the container 130, the bottom of the juice extraction mesh 110, or the upper surface of the main body 700.

In this configuration, the support part 200 further includes the plurality of contact ribs 210 as illustrated which generate an adhesion to the outer circumferential surface of the driving shaft 600 by the pressure generated by dregs applied from the outer side of the downward expanding diameter part 520 and form the plurality of barriers as described above to certainly maintain the airtightness.

Figure 16:
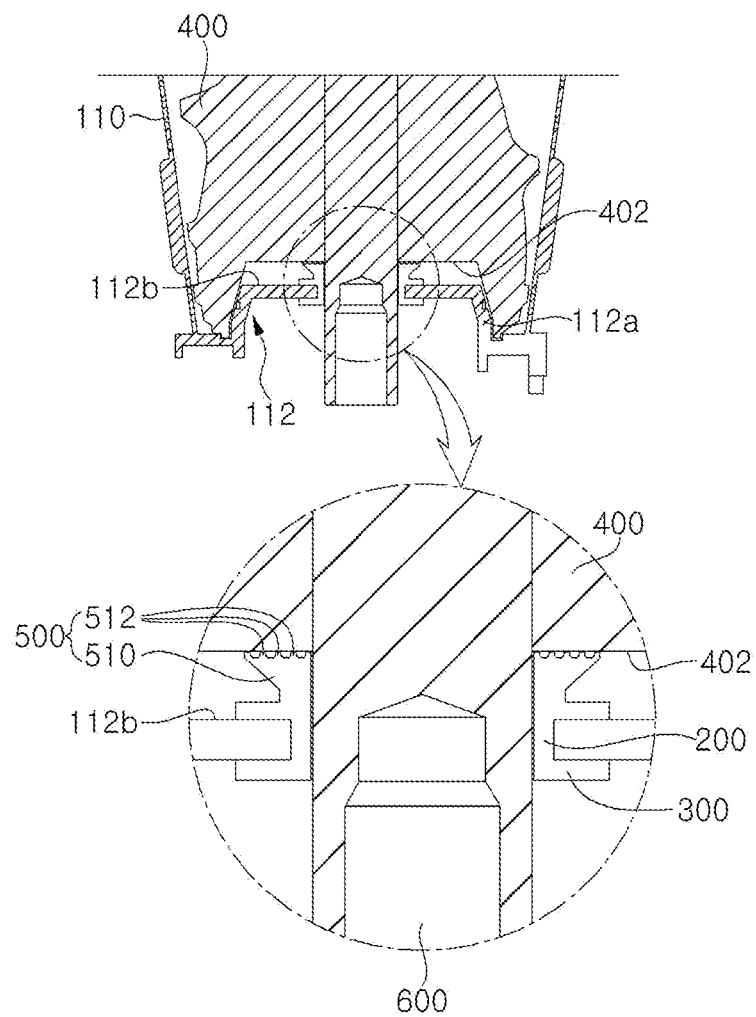
Figure 17:
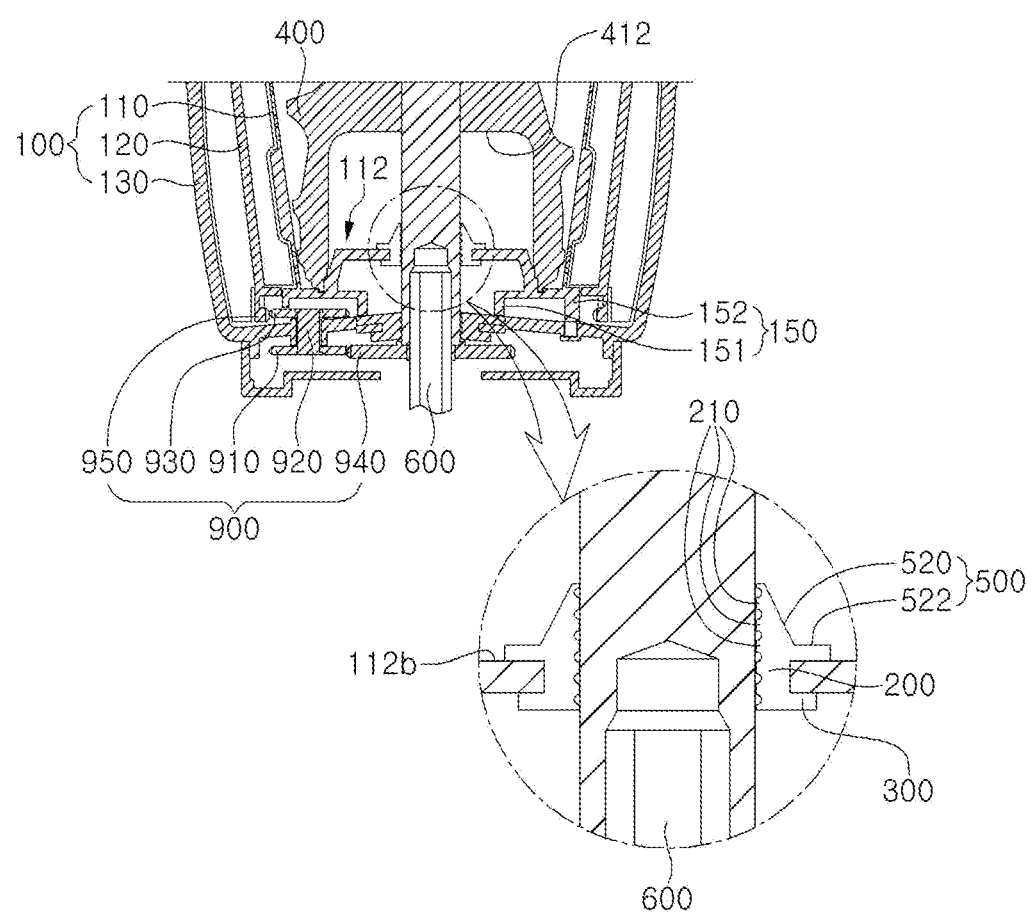

Meanwhile, as illustrated in FIGS. 16 and 17, the juice extraction module for juice according to the embodiment of the present invention may further include the hollow dregs blocking part 112 which protrudes to be stepped from the bottom of the juice extraction mesh 110 and has the central portion through which the driving shaft 600 penetrates, to thereby prevent dregs from being introduced through the adhesion with the screw 400 in the juice extraction mesh 110 itself.

Here, the screw 400 is seated in the dregs blocking part 112, the support part 200 is mounted in the dregs blocking part 112, and the stand part 300 is fixed to the dregs blocking part 112.

In this case, as illustrated in FIG. 16, the juice extraction module for juice according to the embodiment of the present invention may further include the screw groove 402 which is formed to be depressed from the bottom of the screw 400 to correspond to the dregs blocking part 112 so as to adhere to the dregs blocking part 112, together with the dregs blocking part 112, in which the support part 200 is mounted in the dregs blocking part 112, the stand part 300 is fixed to the dregs blocking part 112, and the blocking adhering part 500 adheres to the screw groove 402.

Further, the blocking adhering part 500 includes the upward expanding diameter part 510 which has a gradually increasing diameter toward the upper end to maintain the airtightness while adhering by the load of the screw 400 itself and the plurality of adhering ribs 512 which protrude while being spaced apart from each other in a concentric circle form at the upper surface of the upward expanding diameter part 510 and adhere to the bottom of the screw 400.

Figure 18:
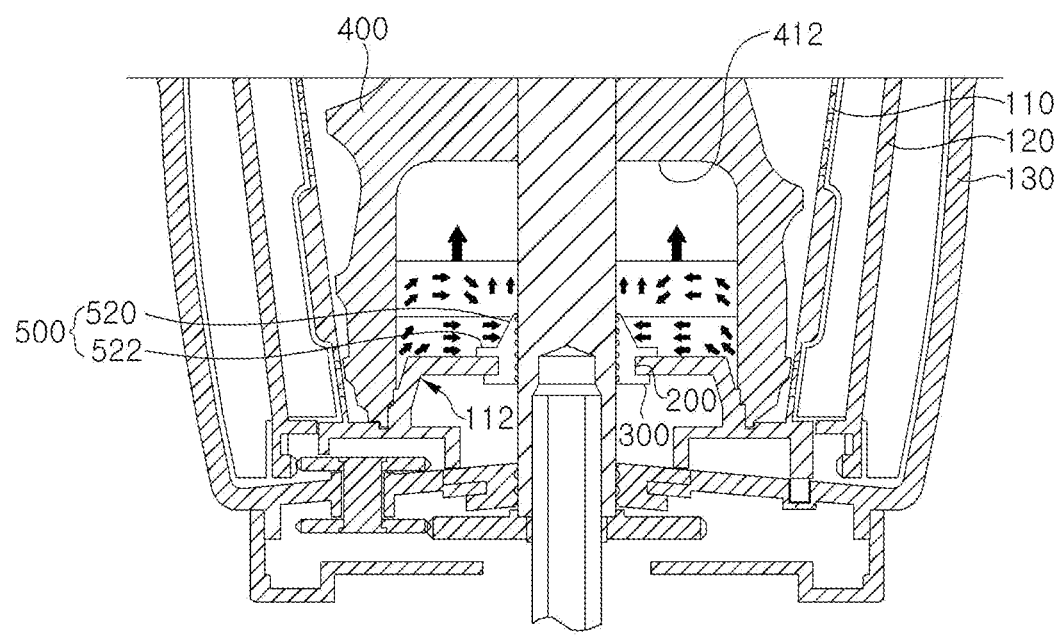

Further, as illustrated in FIG. 18, the juice extraction module for juice according to the embodiment of the present invention may further include the screw cavity 412 which is depressed from the bottom of the screw 400, accommodates the dregs block part 112, and forms an extra space portion in which dregs introduced from the juice extraction mesh 110 are temporarily accommodated, along with the dregs blocking part 112.

Here, the support part 200 is mounted in the dregs blocking part 112, the stand part 300 is fixed to the dregs blocking part 112, and the blocking adhering part 500 adheres to the outer circumferential surface of the driving shaft 600 by the pressure of dregs temporarily accommodated as illustrated in FIG. 18.

In this case, the blocking adhering part 500 includes the downward expanding diameter part 520 having a gradually increasing diameter toward from the outer circumferential surface of the upper end of the support part 200 toward the lower portion to adhere to the outer circumferential surface of the driving shaft 600 by the pressure of dregs and the adhering flange part 522 which extends from the edge of the downward expanding diameter part 522 to be fixed to the bottom of the container 130, the bottom of the juice extraction mesh 110, or the upper surface of the main body 700.

Further, the support part 200 further includes the plurality of contact ribs 210 which adhere to the outer circumferential surface of the driving shaft 600 by the pressure of dregs and disposed to be spaced apart from each other along the vertical direction of the inner circumferential surface to form the plurality of barriers, to thereby certainly maintain the airtightness without hindering the rotation of the driving shaft 600.

Figure 19:
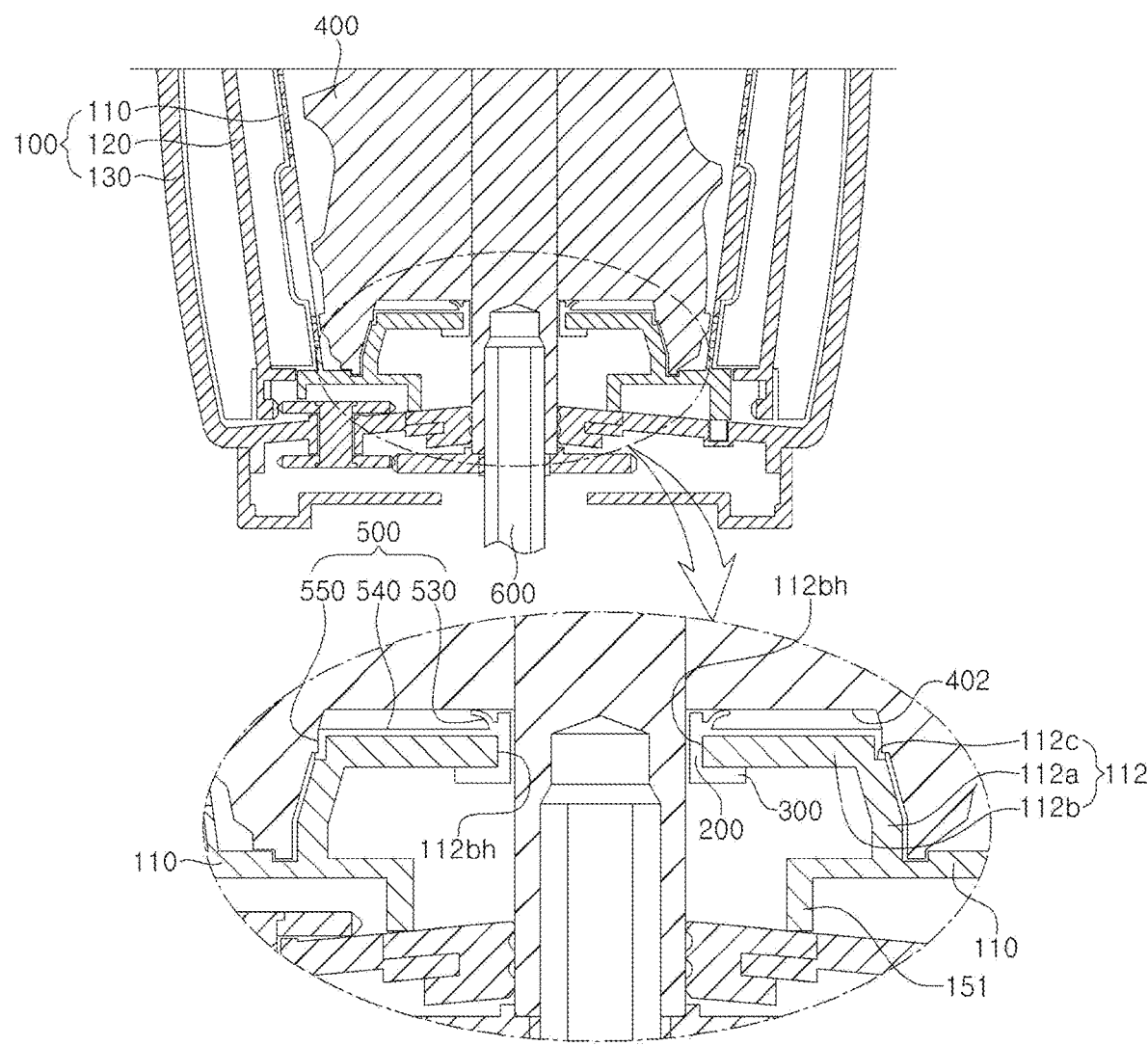

Meanwhile, describing in more detail with reference to FIG. 19, the dregs blocking part 112 may include a protruding barrier rib 112a, a seating surface 112b, and a seating step 112c.

The seating step 112c is formed to be stepped along an outer circumferential surface of the protruding barrier rib 112a and the screw 400 is locked to the seating step 112c.

The outer circumferential surface of the support part 200 adheres to the communicating hole 112bh, the stand part 300 is fixed to the lower surface of the seating surface 112b, and the blocking adhering part 500 extends to the upper surface of the seating surface 112b and the bottom surface of the screw 400 to adhere thereto, thereby more certainly maintaining the airtightness.

Here, the blocking adhering part 500 includes the adhering lip 530, an airtight pad 540, and an airtight sleeve 550 to correspond to the shape of the dregs blocking part 112 as illustrated.

The adhering lip 530 extends along the outer circumferential surface of the upper end of the support part 30 to have the shape deformed and adheres to the bottom of the screw 400, that is, the screw groove 402.

The airtight pad 540 extends along the outer circumferential surface of the upper end of the support part 200 to be disposed at the lower portion of the adhering lip 530 and cover the upper surface of the seating surface 112b.

The airtight sleeve 550 extends to the seating step 112c along the edge of the airtight pad 540.

Meanwhile, the juice extraction module for juice according to the embodiment of the present invention further includes the foregoing isolating means 150 which structurally maintains the state in which the bottom of the container 130 is spaced apart from the lower portion of the juice extraction mesh 110, together with the support part 200, the stand part 300, and the blocking adhering part 500, thereby more certainly maintaining the airtightness.

For reference, the driving force according to the embodiment of the present invention is transferred to the rotating brush 120 from the driving gear 950 which is mounted in the driving transmission assembly 900, that is, the driving shaft 600 through the lower transmission gear 910, the middle shaft 920, the upper transmission gear 930, and the driven gear 950, such that the screw 400 and the rotating brush 120 may simultaneously rotate.

Therefore, the isolating means 150 may be a technical means which may certainly maintain the airtightness without hindering the gear connection and the rotation of the upper transmission gear 930 and the driven gear 950.

Figure 20:
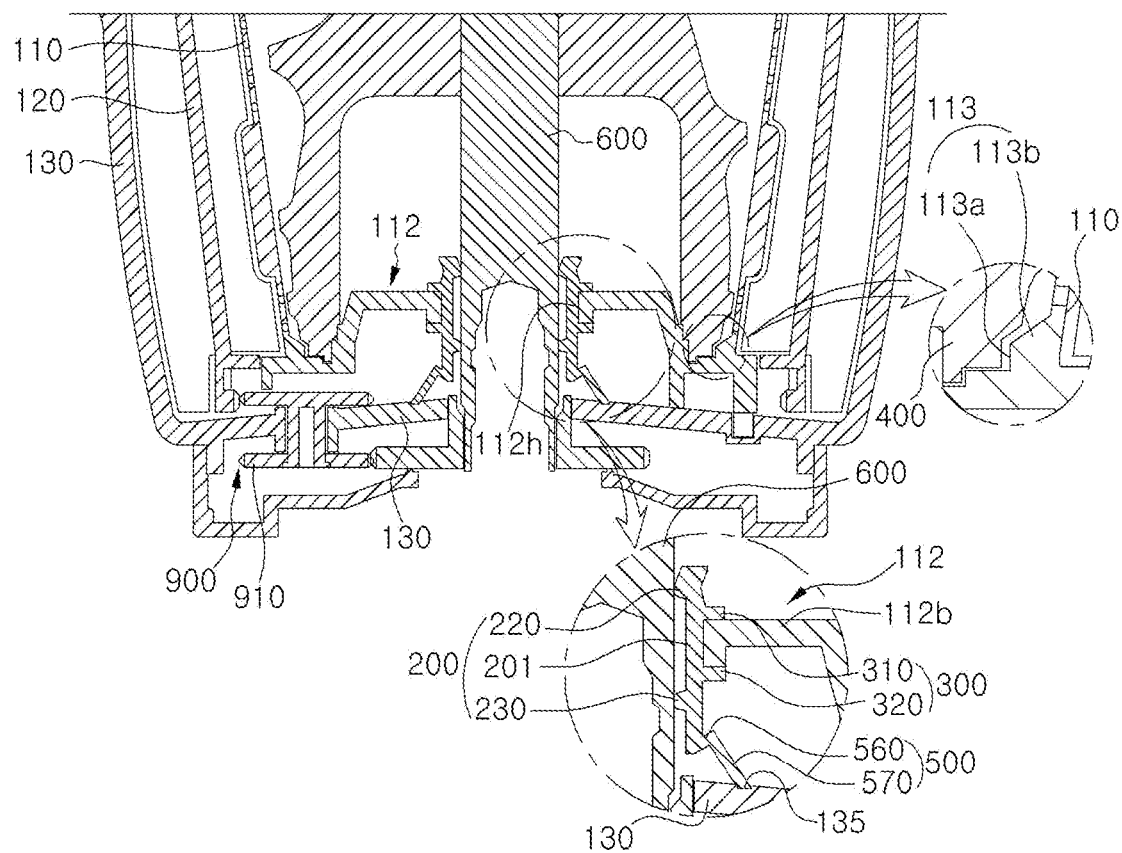
FIG. 20 is a cross-sectional conceptual view illustrating a structure of a support part, a stand part, and a blocking adhering part which are mounted in the juice extraction module, which are main parts of a juice extraction module for juice according to other embodiments of the present invention.

Meanwhile, as illustrated in FIG. 20, the present invention may apply the embodiment of the structure including the blocking adhering part 500 having the shape deformed.

That is, according to the embodiment of the present invention, the hollow dregs blocking part 112 protrudes to be stepped from the bottom of the juice extraction mesh 110 and have the central portion provided with the blocking hole 112*h* through which the driving shaft 600 penetrates.

Here, the support part 200 is configured to have the outer circumferential surface facing the edge of the blocking hole 112*h* and extend toward the bottom inside the container 130.

In this case, the stand part 300 is configured to be formed at the outer circumferential surface of the support part 200 to be fixed to the blocking hole 112 and stand the load of the support part 200.

Therefore, the blocking adhering part 500 extends from the edge of the lower end of the support part 200 to have the shape deformed and the lower end thereof adheres to the bottom inside the container 130 to prevent dregs or juice from being leaked to the container 130 or the main body.

Describing in detail, the support part 220 includes the main body 201 of the support part and the first and second adhering lips 220 and 230.

The main body 201 of the support part is a cylindrical member having an inner diameter larger than the outer diameter of the driving shaft 600.

Further, the first adhering lip 220 extends from the edge of the upper end to have one end adhering to the outer circumferential surface of the driving shaft 600 and the second adhering lip 230 protrudes in a ring shape along the inner circumferential surface of the main body 201 of the support part to be disposed at the lower portion of the first adhering lip 220 and adhere to the outer circumferential surface of the driving shaft 600.

Therefore, the first and second adhering lips 220 and 230 prevent the juice-extracted dregs and the juice from flowing down to the container 130 due to the juice-extracted dregs and the juice flowing down along the driving shaft 600, thereby primarily maintaining the airtightness.

Further, the stand part 300 includes a first fixing lip 310 which protrudes from the outer circumferential surface of the support part 200 to adhere to the upper surface of the dregs blocking part 112 and a second fixing lip 320 which protrudes from the outer circumferential surface of the support part 200 to be disposed at the lower portion of the first fixing lip 310 to adhere to the lower surface of the dregs blocking part 112.

Therefore, the first and second fixing lips 310 and 320 prevent the juice-extracted dregs and the juice from flowing down to the container 130 through the blocking hole 112*h* of the dregs blocking part 112, thereby secondarily maintaining the airtightness.

Further, the blocking adhering part 500 includes a flexible upward expanding diameter sleeve 560 which extends to be inclined upward along the outer circumferential surface of the lower end of the support part to have the shape deformed and a flexible downward expanding diameter sleeve 570 which extends to be inclined downward along the edge of the upper end of the upward expanding diameter sleeve and has a shape deformed so that an edge of a lower end thereof adheres to the bottom inside the container 130.

Therefore, in the blocking adhering part 500, the edge of the lower end of the downward expanding diameter sleeve 570 contacts the bottom inside the container 130 when the user seats the juice extraction mesh 110 in the container 130 and then the downward expanding diameter sleeve 570 more adheres to the bottom of the container 130 by the weight of the screw 400 itself when the screw 400 to be connected to the driving shaft 600 is seated in the juice extraction mesh 100.

In this case, the upward expanding diameter sleeve 560 and the downward expanding diameter sleeve 570 have a section having a reverse 'V'-letter shape and strongly adhere to the bottom inside the container 130 while the mutual inclined angle and shape thereof are changed, thereby certainly preventing dregs and juice from being leaked.

Further, the juice extraction module for juice according to the embodiment of the present invention may further include a sleeve seating groove 135 depressed in a ring shape at the bottom inside the container 130 so that an edge of a lower end of the downward expanding diameter sleeve 570 may be seated at an accurate position.

Meanwhile, the juice extraction module for juice according to the embodiment of the present invention may further include a plurality of juice extraction auxiliary protrusions 113 which are formed at the bottom and the inner side of the juice extraction mesh 110 at a predetermined interval to face the outer circumferential surface of the lower portion of the screw 400, to thereby increase the juice extraction rate by once more grinding materials which are juice-extracted by the screw 400 and then discharged down.

That is, the juice extraction auxiliary protrusions 113 includes a plurality of protruding pieces 113*a* which protrude from the bottom of the juice extraction mesh 110 to be connected to the inner side of the juice extraction mesh 110 and tilted pieces 113*b* which extend to be inclined upward from the upper end of the protruding pieces 113*a* toward the inner side of the juice extraction mesh 110.

Therefore, raw materials which are ground and juice-extracted between the screw 400 and the juice extraction mesh 110 is primarily crushed once between the outer circumferential surface of the lower portion of the screw 400 and the tilted piece 113*b* while descending toward the bottom of the juice extraction mesh 110 and then is secondarily crushed between the outer circumferential surface of the lower portion of the screw 400 and the protruding piece 113*a* to perform the juice extraction to the utmost.

Figure 21:
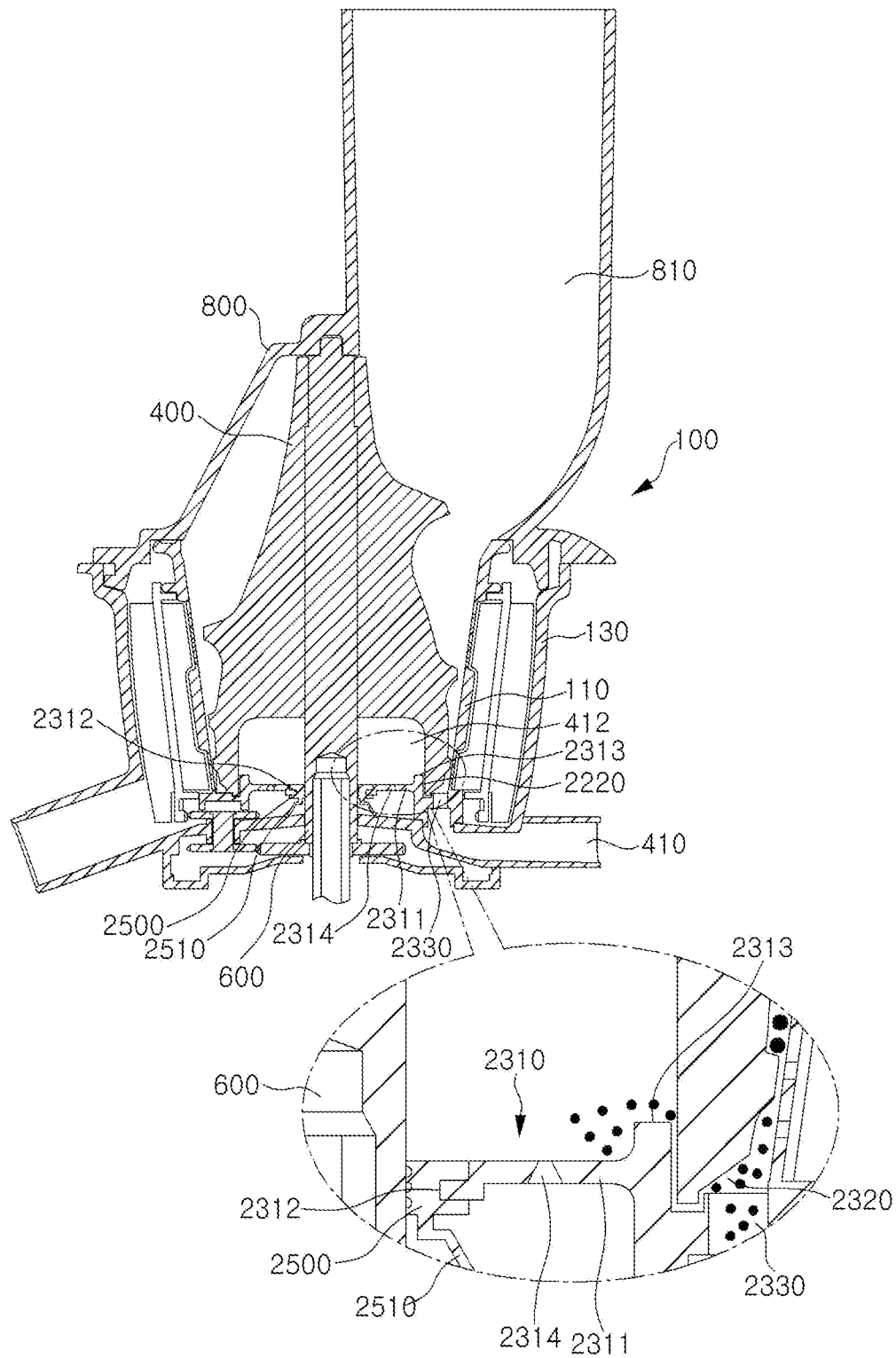
FIG. 21 is a cross-sectional view illustrating a juice extraction module for juice according to another embodiment of the present invention.
Figure 22:
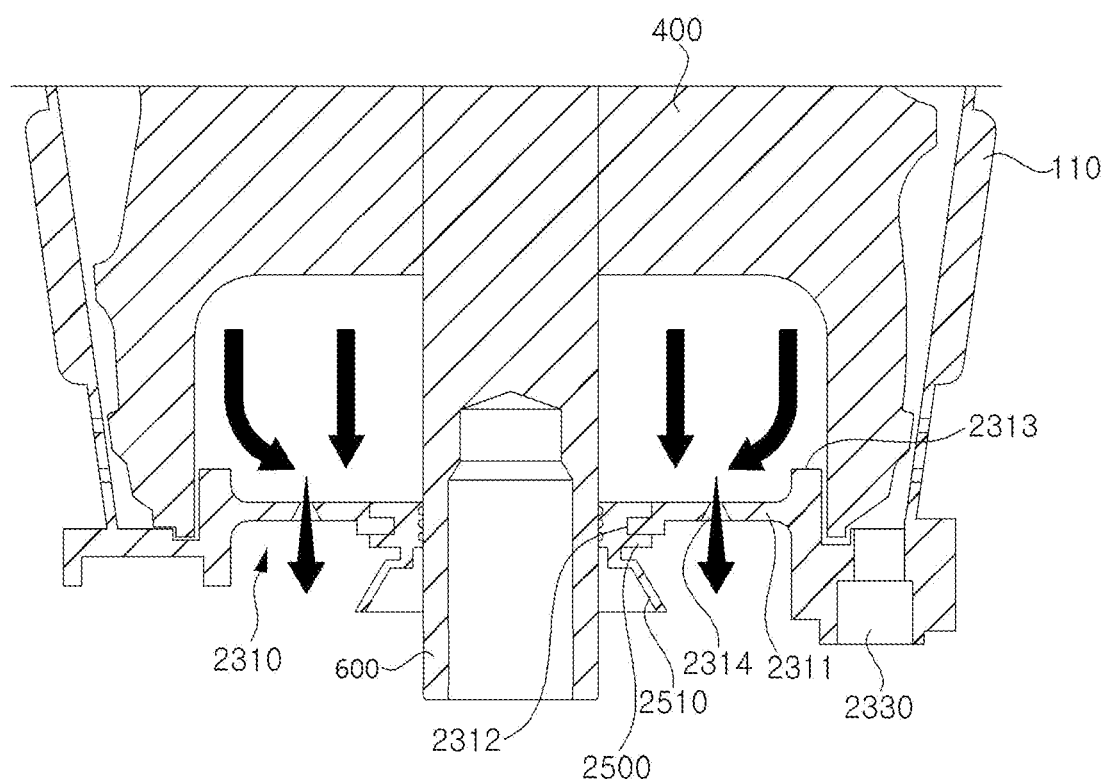
FIG. 22 is a cross-sectional view illustrating a juice extraction module for juice according to another embodiment of the present invention.

In FIGS. 21 and 22, a dregs blocking part 2310 is configured to be provided with a blocking layer 2311 so that the bottom of the juice extraction mesh 110 is isolated from a bottom of the container, in which a central portion of the blocking layer 2311 is provided with a hollow 2312 through which the driving shaft 600 penetrates and an upper end of the blocking layer 2311 includes the dregs blocking part 2310 which is provided with a ring-shaped reflow prevention protrusion 2313.

The screw is seated in the dregs blocking part and a screw groove 2220 may be formed to be depressed from the bottom of the screw 400 to correspond to the dregs blocking part 231 so that it adheres to the dregs blocking part 2310.

The screw cavity 412 is depressed from the bottom of the screw 400, accommodates the dregs blocking part 2310 and may also be formed in the extra space portion in which the dregs introduced from the juice extraction mesh 110 are temporarily accommodated.

The outer circumferential surface of the dregs blocking part 2310 forms a stair-shaped layer, the screw is seated in the dregs blocking part to form a layer to correspond to the stair shape of the outer circumferential surface of the dregs blocking part 2310 so that it adhere to the dregs blocking part 2310, thereby more suppressing dregs from being entered.

An outer side of the dregs blocking part 2310 is provided with an arc-shaped dregs discharge passage 2320 and an end of the dregs discharge passage 2320 is provided with a dregs outlet 2330 through which dregs may be discharged.

The outlet 2330 is inserted into and communicates with the dregs discharge path 410 formed at the bottom of the container 130 to discharge dregs to the outside.

The blocking layer 2311 of the dregs blocking part 2310 may be provided with at least one juice discharge hole 2314 to discharge juice.

A diameter of the juice discharge hole 2314 is formed at 1.5 cm or less to prevent dregs beyond a predetermined size from passing.

The juice discharge hole 2314 has a diameter increasing from an inner side toward an outer side to prevent fine dregs from being accumulated and to smoothly discharge the juice-extracted solution to the outside.

The hollow 2312 of the dregs blocking part 2310 is provided with a packing member 2500 which adheres to the outer circumferential surface of the driving shaft 600 to prevent dregs from being leaked through a part through which the driving shaft penetrates.

The packing member 2500 has a lower surface provided with the blocking adhering part 2510 which protrudes in a concentric circle form and has an end adhering to the bottom surface of the container 130, thereby preventing the juice extracted solution from being leaked in a gap direction of the part where the driving shaft 600 penetrates through the container.

According to the embodiment of the present invention configured as described above, an object to be juice-extracted put through the inlet 810 is crushed and compressed between the screw 400 and the juice extraction mesh 110 and thus the juice-extracted solution is discharged to a hole (not illustrated) of the juice extraction mesh and dregs are transferred to the lower portion to be discharged to the dregs discharge path 410 through the dregs discharge passage 2320 and the dregs outlet 2330.

The dregs are normally discharged to the dregs discharge path 410 but some of the dregs enter a direction of the dregs blocking part 2310 through the lower end of the screw 400.

The dregs entering the direction of the dregs blocking part 2310 are blocked by the dregs blocking part 2310 not to enter the container and are accommodated in the dregs blocking part 2310 and the screw 400 and the dregs entering the dregs blocking part 2310 and the screw 400 remain while containing a predetermined amount of juice-extracted solution.

Typically, the dregs contained in the remaining juice-extracted solution as described above are continuously accumulated in the screw by the dregs blocking part 2310 protruding to be stepped and when the dregs in the screw reaches a saturated state, the just-extracted solution contained in the dregs reflows by the pressure to be discharged to the dregs discharge path 410 while being mixed with dregs, which leads to a problem of reducing the juice-extracted amount.

Therefore, to solve the existing problem as described above, the juice extraction module for juice according to the embodiment of the present invention includes a juice discharge hole 2314 through which the juice-extracted solution moves downwardly to be discharged to the container when the dregs are accumulated in the dregs blocking part 310 and the screw 400 and includes the reflow preventing protrusion 2313 to prevent the dregs from reflowing in the direction of the dregs discharge path 410 when the dregs reach a saturated state and thus moves downwardly by the pressure, thereby collecting the juice-extracted solution in the direction of the juice discharge hole 2314.

As described above, according to the embodiment of the present invention, dregs having a predetermined size are prevented from being introduced into the juice-extracted solution stored in the container 130 and the juice-extracted solution remaining in the dregs blocking part 2310 may be discharged to the container 130, thereby preventing the juice-extracted amount from reducing.

Figure 23:
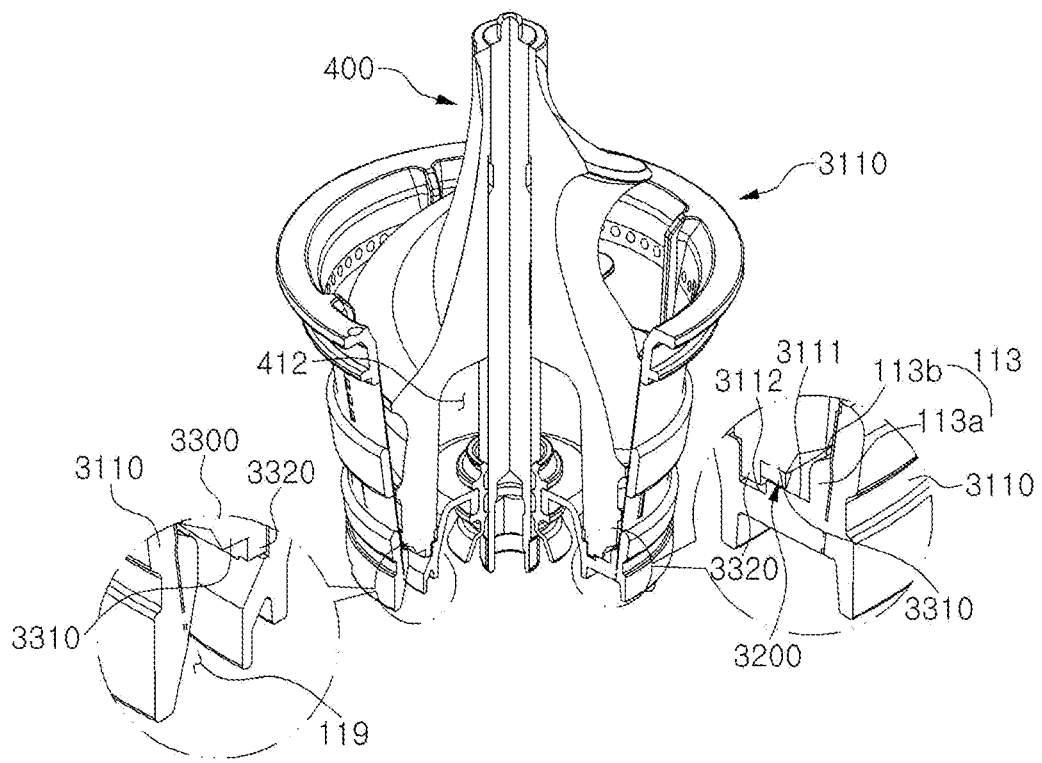
FIG. 23 is a partial cut-away perspective view illustrating an internal structure cut along a vertical shaft direction of the screw in a state in which a screw is seated in the juice extraction mesh which is the main part of the juice extraction module for juice according to the embodiment of the present invention.
Figure 24:
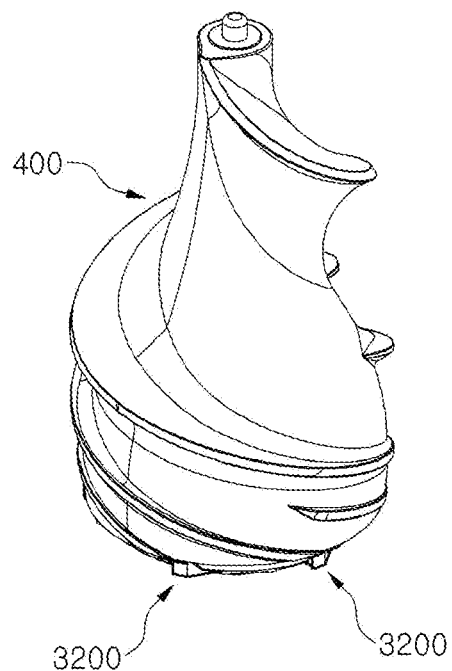
FIG. 24 is a perspective view illustrating an appearance of the screw which is the main part of the juice extraction module for juice according to an embodiment of the present invention.

FIG. 23 is a partial cut-away perspective view illustrating an internal structure cut along a vertical shaft direction of the screw in a state in which a screw is seated in the juice extraction mesh which is the main part of the juice extraction module for juice according to the embodiment of the present invention.

Figure 25:
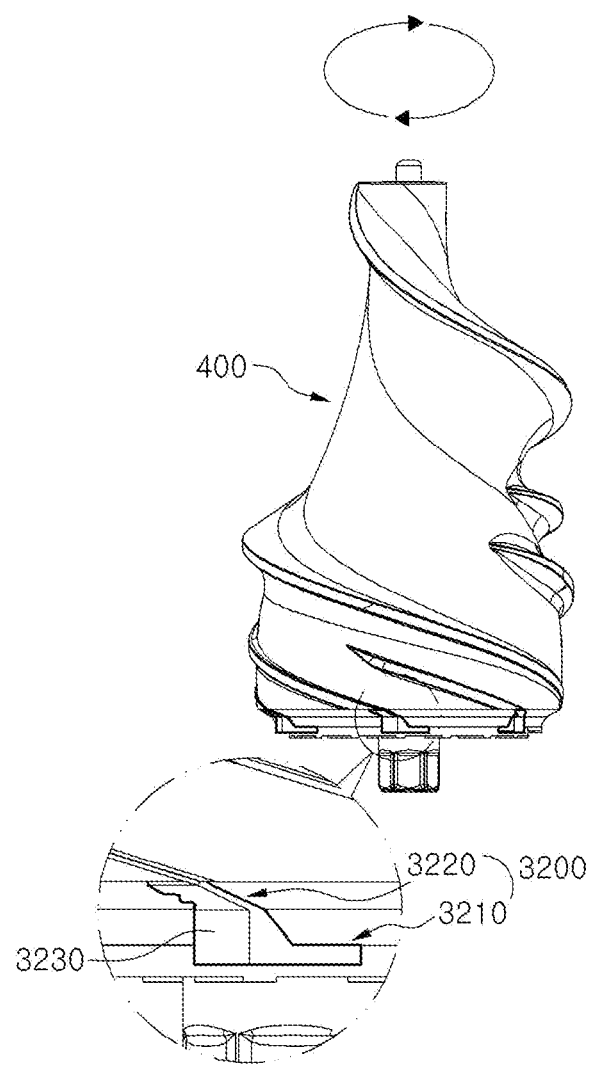
FIG. 25 is a side conceptual diagram illustrating the appearance of the screw which is the main part of the juice extraction module for juice according to an embodiment of the present invention.

Further, FIG. 23 is a perspective view illustrating an appearance of the screw which is the main part of the juice extraction module for juice according to the embodiment of the present invention and FIG. 25 is a side conceptual diagram illustrating the appearance of the screw which is the main part of the juice extraction module for juice according to an embodiment of the present invention.

Figure 26:
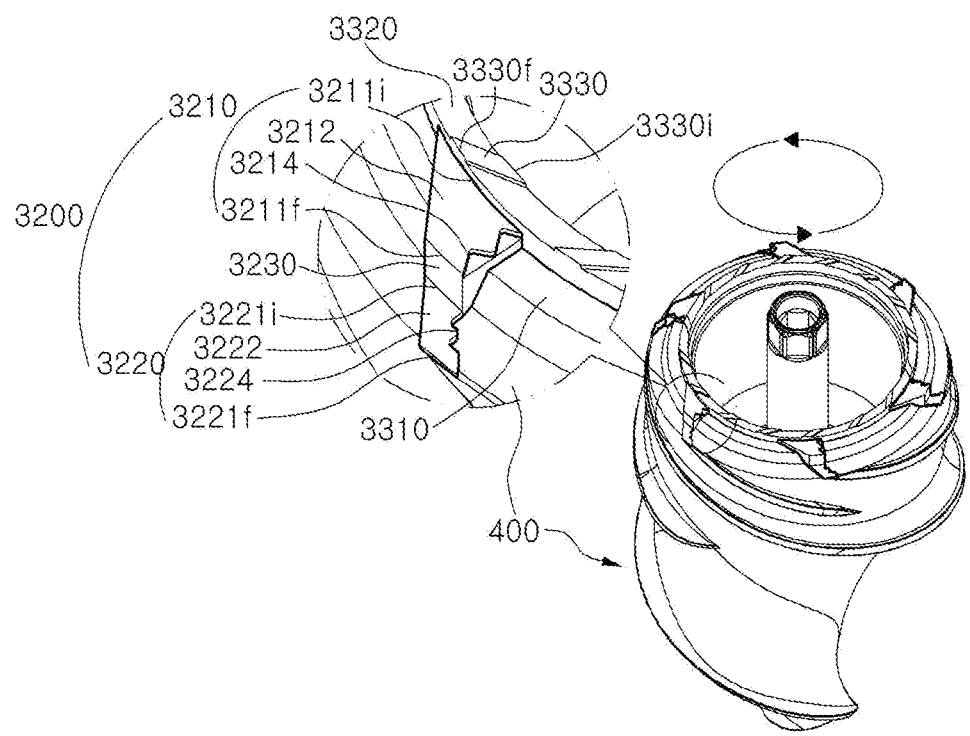
FIG. 26 is a perspective view of a structure of a cutting unit, which is the main part of the juice extraction module for juice according to the embodiment of the present invention, viewed from the bottom of the screw.
Figure 27:
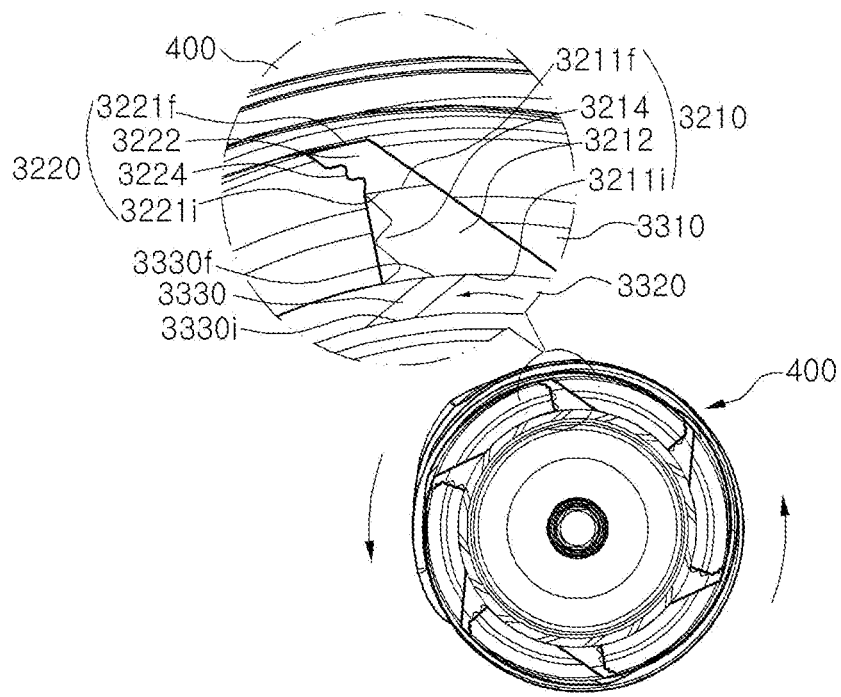
FIG. 27 is a plan conceptual diagram view of the structure of the cutting unit, which is the main part of the juice extraction module for juice according to the embodiment of the present invention, viewed from the bottom of the screw.

Further, FIG. 26 is a perspective view of a structure of a cutting unit, which is the main part of the juice extraction module for juice according to the embodiment of the present invention, viewed from the bottom of the screw and FIG. 27 is a plan conceptual diagram view of the structure of the cutting unit, which is the main part of the juice extraction module for juice according to the embodiment of the present invention, viewed from the bottom of the screw.

As illustrated, the embodiment of the present invention includes the juice extraction module 100 and a cutting unit 3200.

The cutting unit 3200 is disposed to be spaced apart from each other in the rotating direction of the screw 400 while being formed to be stepped at the bottom of the screw 400 and is juice-extracted between the screw 400 and the juice extraction mesh 110 to more finely crush dregs of raw materials moving to the outlet 119.

Therefore, dregs 3600 (see FIGS. 28 and 29) of raw materials contact the cutting unit 3200 colliding with the screw 400 by the rotation to be finely crushed.

According to the present invention, the embodiment as described above may be applied, and various embodiments to be described below may also be applied.

First, to promote the weight reduction of the screw 400 provided with the cutting unit 3200 to be described below, in some cases, the bottom may be further provided with the screw cavity 412 as illustrated in FIG. 23.

The juice extraction module 100 may further include a guide groove 3111 which rotates engaging with the cutting unit 3200 to be described below as illustrated in FIG. 23 to more finely crush the dregs 3600 of raw materials, a main step 3310, a stepped groove 3112, a ring step 3320, and a transfer rib 3330.

In detail, the dregs guide groove 3111 is depressed in a ring shape at the bottom of the juice extraction mesh 110 and the main step 3310 protrudes in a ring shape at the bottom of the screw 400 to be seated in the dregs guide groove 3111.

In detail, the stepped groove 3112 is depressed in a ring shape along an edge of an inner side of the dregs guide groove 3111 and the ring step 3320 protrudes in a ring shape at the bottom of the main step 3310 to be accommodated in the step groove 3112.

In detail, the transfer rib 3330 is disposed at a bottom of the ring step 3320 at a predetermined interval to contact the stepped groove 3112 and is plural members to be inclinedly formed from an edge of an inner side toward an edge of an outer side of the ring step 3320 and serves to guide the dregs of raw materials input and crushed from an input part (hereinafter, see FIG. 1) toward one direction along the rotating direction of the screw 400, that is, toward the outlet 119 and serves to crush the dregs of the raw materials like being ground by a millstone.

Here, compared with the formation direction of the transfer rib, the cutting unit 3200 to be described below extends in an opposite direction to the inclined direction of the transfer rib 3330 from the edge of the outer side of the ring step 3320 to finely crush the dregs 3500 by contacting at the most front of the rotating direction of the screw 400.

In this case, referring to FIGS. 26 and 27, the transfer rib 3330 includes a first end 3330i which is formed at one point of an edge of an inner side of the ring step 3320 and a second end 3330f which is formed at one point of an edge of an outer side of the ring step 3320.

The transfer rib 3330 generally has a bar shape and the second end 3330f is disposed at a back side in a direction in which the screw 400 rotates to guide the dregs 3600 in one direction along the rotating direction of the screw 400.

Meanwhile, referring back to FIG. 23, the juice extraction module for juice 100 according to the embodiment of the present invention may further include the plurality of juice extraction auxiliary protrusions 113 which are formed at the bottom and the inner side of the juice extraction mesh 110 at a predetermined interval to face the outer circumferential surface of the lower portion of the screw 400, to thereby increase the juice extraction rate by once more grinding materials which are juice-extracted by the screw 400 and then discharged down.

That is, the juice extraction auxiliary protrusions 113 includes a plurality of protruding pieces 113a which protrude from the bottom of the juice extraction mesh 110 to be connected to the inner side of the juice extraction mesh 110 and tilted pieces 113b which extend to be inclined upward from the upper end of the protruding pieces 113a toward the inner side of the juice extraction mesh 110.

Therefore, raw materials which are ground and juice-extracted between the screw 400 and the juice extraction mesh 110 is primarily crushed once between the outer circumferential surface of the lower portion of the screw 400 and the tilted piece 113b while descending toward the bottom of the juice extraction mesh 110 and then is secondarily crushed between the outer circumferential surface of the lower portion of the screw 400 and the protruding piece 113a to perform the juice extraction to the utmost.

Meanwhile, the cutting unit 3200 is formed to be stepped at the bottom of the screw 400 as described above and referring to FIGS. 26 and 27, includes a first cutting part 3210 and a second cutting part 3320.

The first cutting part 3210 is formed at the main step protruding in a ring shape at the bottom of the screw at a predetermined interval and crushes the dregs of the raw materials contacting between the main step 3310 and the bottom of the juice extraction mesh 110 while contacting the bottom of the juice extraction mesh;

The second cutting part 3220 extends from the end of the first cutting part 3210 to the edge of the outer side of the bottom of the screw 400 and crushes the dregs of raw materials contacting between the bottom of the screw 400 and the bottom of the juice extraction mesh 110 while contacting the bottom of the juice extraction mesh 110.

The cutting unit 3200 may be further provided with a connecting protruding piece 3230 which connects between the edge of the outer side of the first cutting part 3210 and the edge of the inner side of the second cutting part 3220 along the main step 3310 so that the dregs 3600 is finely crushed without remaining to move to the outlet 119 (hereinafter, referring to FIG. 23) depending on the rotation of the screw 400.

Describing in more detail, the first cutting part 3210 includes a first main cutting end 3211i, a second main cutting end 3211f, a first transfer protruding piece 3212, and a first sawtooth 3214.

The first main cutting end 3211i is formed at one point of the edge of the outer side of the ring step which protrudes in a ring shape along an edge of an inner side of the main step 3310.

The second main cutting end 3211f is formed at one point of an edge of an outer side of the main step.

The first transfer protruding piece 3212 is a trapezoidal-shaped flat member to connect between the first main cutting end 3211i and the second main cutting end 3211f.

At least one first sawtooth 3214 is formed to be stepped at an edge of one side of the first transfer protruding piece 3212 to finely cut and crush those containing long and tough fibers such as water celery, bean sprouts, and celery among the dregs 3600 contacting the screw 400 depending on the rotating direction of the screw 400.

Here, a width of the first main cutting end 3211i is formed to be wider than that of the second main cutting end 3211f, the edge of one side of the first transfer protruding piece 3212 is disposed at the front side in the direction in which the screw 400 rotates, and as illustrated in FIG. 27, is formed to be orthogonal to the edge of the outer side of the ring step 3320.

Therefore, when the screw 400 rotates, the dregs 3600 between the bottom of the screw 400 and the bottom of the juice extraction mesh 110 may be more finely cut and crushed by the first sawtooth 3214 while being collected at one place by the first transfer protruding piece 3210.

To this end, a blade-shaped stepped blade 119b is further provided along an edge of one side of the outlet 119, that is, an edge of a front in a direction in which the screw 400 rotates and may more finely cut and crush the dregs 3600 in cooperation with the first sawtooth 3214.

Meanwhile, describing in more detail, the second cutting part 3220 includes a second sub cutting end 3221i, a second sub cutting end 3221f, a second transfer protruding piece 3222, and a second sawtooth 3224.

The first sub cutting end 3221i is formed at one point of an edge of an outer side of the main step 3310.

The second sub cutting end 3221f is formed at one point of the edge of the outer side of the bottom of the screw 400.

The second transfer protruding piece 3222 is a bar-shaped member to connect between the first sub cutting end 3221i and the second sub cutting end 3221f.

At least one second sawtooth 3224 is formed to be stepped along an edge of one side of the second transfer protruding piece 3222 to finely cut and crush ones containing long and tough fibers such as water celery, bean sprouts, and celery among the dregs 3600 contacting the screw 400 depending on the rotating direction of the screw 400.

Here, the second sub cutting end 3221f is disposed at the front in the direction in which the screw 400 rotates and thus the second sawtooth 3224 contacts the dregs 3600 to more finely cut and crush the dregs 3600.

To this end, a blade-shaped stepped blade 119b is further provided along an edge of one side of the outlet 119, that is, an edge of a front in a direction in which the screw 400 rotates and may more finely cut and crush the dregs 3600 in cooperation with the second sawtooth 3224.

An operating mechanism and an action effect of the first or second sawteeth 214 and 224 of the juice extraction module for juice according to the embodiment of the present invention will be briefly described with reference to FIGS. 28 and 29.

Figure 28:
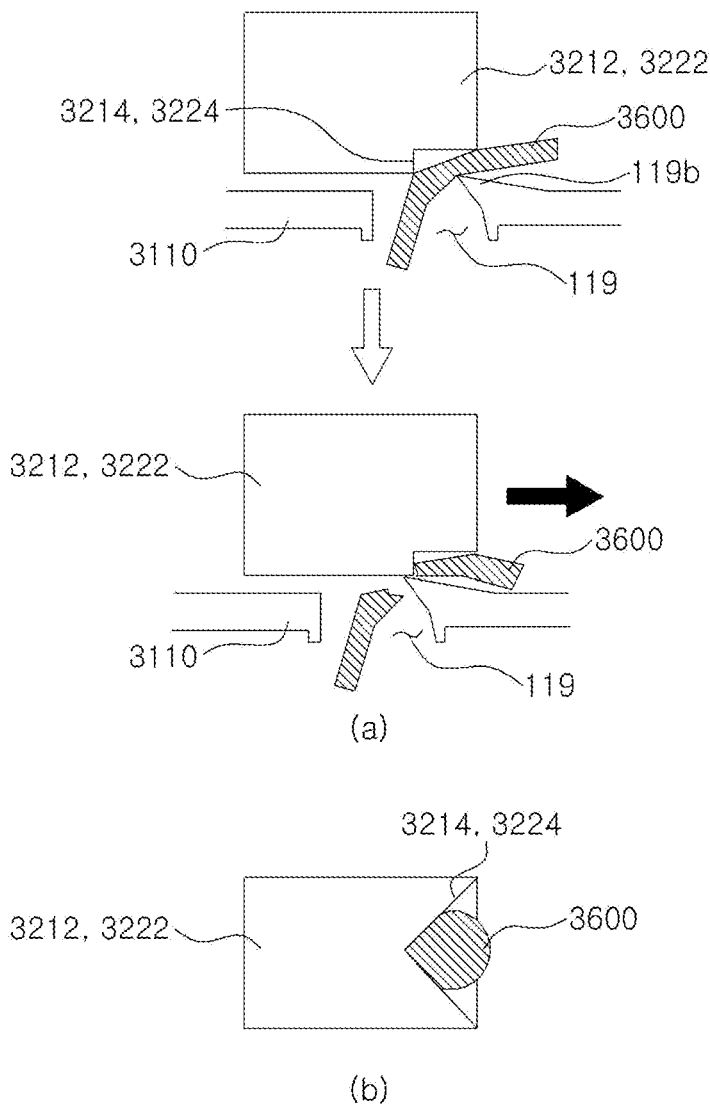
Figure 29:
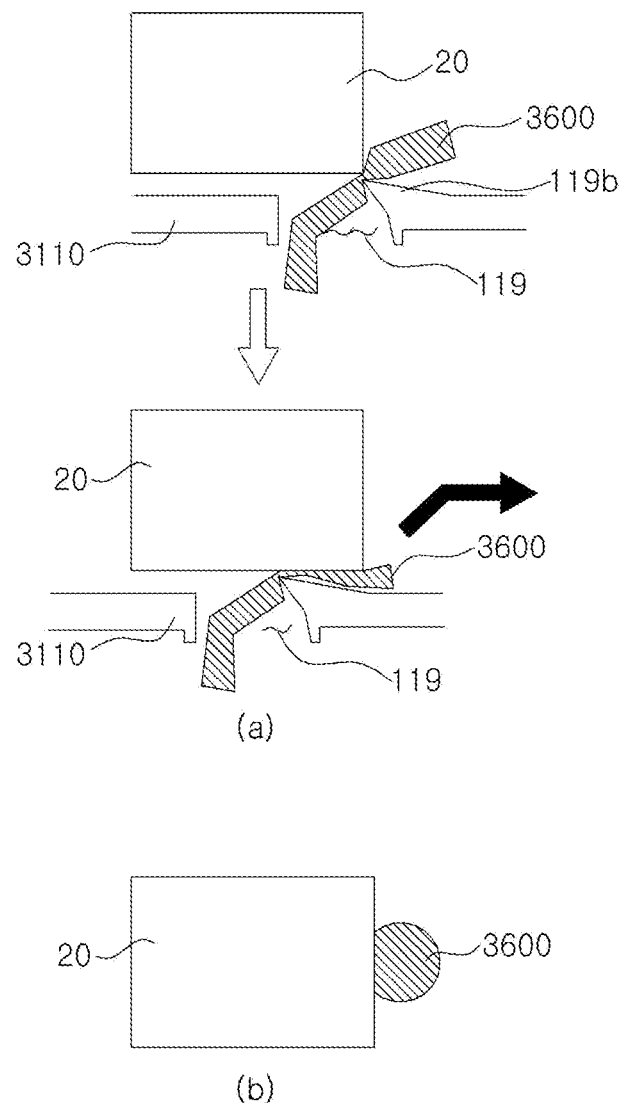

For reference, FIGS. 28 and 29 are comparison conceptual diagrams of a crushing mechanism of a first or second sawtooth formed in the cutting unit which is the main part of the juice extraction module for juice according to the embodiment of the present invention with a case in which the first or second sawtooth is not formed, in which FIG. 28 is a conceptual diagram of a case in which the first or second sawtooth is formed and FIG. 29 is a conceptual diagram of a case in which the first or second sawtooth is not formed.

When the first sawtooth 3214 and the second sawtooth 224 are not provided in the transfer protruding piece 20, even though the step blade 119b is formed at the edge of the outlet 119 of the bottom of the juice extraction mesh 110 while the dregs 3600 of the raw materials having long and tough fibers such as water celery, bean sprouts, and celery are transferred to the outlet 119, the dregs are not finely crushed as illustrated in FIG. 8 and are attracted to the transfer protruding piece 20 as they are not to be discharged.

On the contrary, when the first sawtooth 3214 or the second sawtooth 224 is formed at the first transfer protruding piece 3212 or the second protruding piece 3222, the dregs 3600 of the raw material are finely cut and crushed, engaging with the stepped blade 119b while being transferred to the outlet 119 and thus may be discharged through the outlet 119 to the utmost.

Comparing the case in which the first sawtooth 3214 and the second sawtooth 3224 are present with the case in which the first sawtooth 3214 and the second sawtooth 3224 are not present, it may be appreciated that the crushed degree and the discharge amount of the dregs 3600 have a difference of approximately 40 to 50%.

As described above, it may be appreciated that the basic technical spirit of the present invention is based on the juice extraction module for juice capable of more finely crushing the dregs of the raw materials to improve the juice-extracted efficiency and more improve the texture of juice.

In addition, various modifications and applications may be made by those skilled in the art without departing from the scope of the basic technical spirit of the present invention.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A juice extraction module for juice, comprising:
    a juice extraction mesh configured to accommodate a screw supplied with a driving force to rotate;
    a rotating brush configured to be disposed at an outer side of the juice extraction mesh to rotate along with the screw;
    a container configured to accommodate the screw, the juice extraction mesh, and a rotating brush;
    a driving gear disposed below a bottom of the container, the driving gear configured to be connected to a driving shaft that is connected to the screw to supply the driving force to rotate the screw during operation, and the driving gear configured to rotate with the screw about a common axis and to transfer a brush driving force to the rotating brush;
    a driving transmission assembly configured to have a lower end gear-connected with the driving gear and an upper end disposed at a bottom inside the container; and
    a driven gear configured to be gear-connected with the upper end of the driving transmission assembly and be formed along an inner circumferential surface of a lower portion of the rotating brush to rotate along with the driving transmission assembly,
    wherein the driving gear, the driving transmission assembly, and the driven gear are disposed to be isolated from an inner space of the juice extraction mesh, and
    wherein the driving transmission assembly includes:
        a lower transmission gear disposed outside of the container and configured to be gear-connected with the driving gear which is disposed below the bottom of the container;
        a middle shaft configured to protrude from a central portion of the lower transmission gear to rotate while penetrating through and supported to the bottom of the container; and
        an upper transmission gear disposed inside the container at an upper end of the middle shaft and configured to be gear-connected with the driven gear.

2. The juice extraction module for juice of claim 1, further comprising:
    a hollow dregs blocking part configured to protrude to be stepped from a bottom of the juice extraction mesh and have a driving shaft penetrating through a central portion thereof,
    wherein the dregs blocking part is seated with the screw.

3. The juice extraction module for juice of claim 1, further comprising:
    a hollow dregs blocking part configured to protrude to be stepped from a bottom of the juice extraction mesh and have a central portion provided with a blocking hole through which the driving shaft penetrates;
    a support part configured to have an outer circumferential surface facing an edge of the blocking hole and extend toward a bottom inside the container;
    a stand part configured to be formed at the outer circumferential surface of the support part to be fixed to the blocking hole and stand a load of the support part; and
    a blocking adhering part configured to extend from an edge of a lower end of the support part to have a shape deformed and have a lower end to adhere to the bottom surface inside the container to prevent dregs or juice from being leaked to the container or a main body mounted with the driving shaft.

4. The juice extraction module for juice of claim 3, wherein the blocking adhering part includes:
- a flexible upward expanding diameter sleeve configured to extend to be inclined upward along the outer circumferential surface of the lower end of the support part to have the shape deformed; and
- a flexible downward expanding diameter sleeve configured to extend to be inclined downward along an edge of an upper end of the upward expanding diameter sleeve and have a shape deformed so that an edge of a lower end adheres to the bottom inside the container.

5. The juice extraction module for juice of claim 1, further comprising:
- a dregs blocking part configured to be provided with a blocking layer so that a bottom of the juice extraction mesh is isolated from a bottom of the container, a central portion of the blocking layer being provided with a hollow through which a driving shaft penetrates and an upper end of the blocking layer being provided with a dregs blocking part provided with a ring-shaped reflow prevention protrusion;
- at least one juice discharge hole configured to be provided at the blocking layer of the dregs blocking part to discharge juice; and
- a packing member configured to be mounted in the hollow of the dregs blocking part to adhere to an outer circumferential surface of the driving shaft so as to prevent dregs from being leaked through a portion through which the driving shaft penetrates,
- wherein the dregs blocking part is seated with the screw to prevent the dregs from being leaked to the container through the bottom of the juice extraction mesh.

6. The juice extraction module for juice of claim 5, further comprising:
- a blocking adhering part configured to protrude in a concentric circle form at a lower surface of the packing member to have an end adhering to the bottom of the container.

7. The juice extraction module for juice of claim 1, further comprising:
- a hollow dregs blocking part configured to protrude to be stepped from a bottom of the juice extraction mesh and have a driving shaft penetrating through a central portion thereof,
- wherein the dregs blocking part is seated with the screw to prevent the dregs from being leaked to the container through the bottom of the juice extraction mesh.

8. The juice extraction module for juice of claim 7, further comprising:
- a screw groove configured to be depressed from the bottom of the screw to correspond to the dregs blocking part so as to adhere to the dregs blocking part.

* * * * *